US009783294B2

(12) United States Patent
Johannesson et al.

(10) Patent No.: US 9,783,294 B2
(45) Date of Patent: Oct. 10, 2017

(54) HOVERING UNMANNED AERIAL VEHICLE

(71) Applicant: AERYON LABS INC., Waterloo, Ontario (CA)

(72) Inventors: Glen Johannesson, Waterloo (CA); David Kroetsch, Waterloo (CA); Michael Peasgood, Waterloo (CA); Stephen Marchetti, Trenton (CA)

(73) Assignee: AERYON LABS INC., Waterloo (CA)

( * ) Notice: Subject to any disclaimer, the term of this patent is extended or adjusted under 35 U.S.C. 154(b) by 176 days.

(21) Appl. No.: 14/436,310

(22) PCT Filed: Oct. 17, 2013

(86) PCT No.: PCT/CA2013/050789
§ 371 (c)(1),
(2) Date: Apr. 16, 2015

(87) PCT Pub. No.: WO2014/059549
PCT Pub. Date: Apr. 24, 2014

(65) Prior Publication Data
US 2015/0259066 A1    Sep. 17, 2015

Related U.S. Application Data

(60) Provisional application No. 61/716,052, filed on Oct. 19, 2012.

(51) Int. Cl.
*B64C 27/00*    (2006.01)
*B64C 39/02*    (2006.01)
(Continued)

(52) U.S. Cl.
CPC .............. *B64C 39/024* (2013.01); *B64C 1/30* (2013.01); *B64C 27/08* (2013.01);
(Continued)

(58) Field of Classification Search
CPC ......... B64C 39/024; B64C 1/30; B64C 27/08; B64C 27/20; B64C 11/46; B64C 39/00
See application file for complete search history.

(56) References Cited

U.S. PATENT DOCUMENTS

| 8,931,729 B2 * | 1/2015 | Abde Qader Alzu'bi ................... B64C 27/20 244/17.13 |
| 9,527,588 B1 * | 12/2016 | Rollefstad ............. B64C 39/024 |

(Continued)

FOREIGN PATENT DOCUMENTS

| GB | WO 2010015866 A2 * | 2/2010 | ............... B64C 1/30 |
| WO | 2010015866 | 11/2010 | |

OTHER PUBLICATIONS

PCT/CA2013/050789 International Search Report, completed Jan. 20, 2014.

*Primary Examiner* — Assres H Woldemaryam
(74) *Attorney, Agent, or Firm* — Niall Cooney; Norton Rose Fulbright Canada LLP

(57) ABSTRACT

In an aspect, an apparatus includes a hovering unmanned aerial vehicle (HUAV). The HUAV includes an arm assembly configured to support a propeller in such a way that propeller drag of the propeller is decoupled from yaw torque requirements associated with the hovering unmanned aerial vehicle. In another aspect, an apparatus includes an HUAV that has an arm assembly that is field-foldable relative to the HUAV between a flight-ready state and a folded state. In another aspect, an apparatus includes an HUAV having an arm assembly that is keyed in such a way as to facilitate field-assembly relative to the HUAV.

27 Claims, 19 Drawing Sheets

(51) Int. Cl.
*B64C 27/08* (2006.01)
*B64C 1/30* (2006.01)

(52) U.S. Cl.
CPC .. *B64C 2201/024* (2013.01); *B64C 2201/027* (2013.01); *B64C 2201/102* (2013.01); *B64C 2201/108* (2013.01); *B64C 2201/165* (2013.01); *B64C 2201/20* (2013.01)

(56) References Cited

U.S. PATENT DOCUMENTS

| | | | | |
|---|---|---|---|---|
| 2009/0283629 | A1* | 11/2009 | Kroetsch | A63H 27/12 244/17.23 |
| 2010/0108801 | A1* | 5/2010 | Olm | B64C 39/024 244/17.23 |
| 2011/0226892 | A1* | 9/2011 | Crowther | B64C 1/30 244/17.23 |
| 2013/0287577 | A1* | 10/2013 | Lin | B64C 11/04 416/210 R |
| 2014/0131510 | A1* | 5/2014 | Wang | B64C 39/024 244/17.23 |
| 2014/0339355 | A1* | 11/2014 | Olm | B64C 27/08 244/17.23 |
| 2016/0159471 | A1* | 6/2016 | Chan | B64C 39/024 244/39 |

* cited by examiner

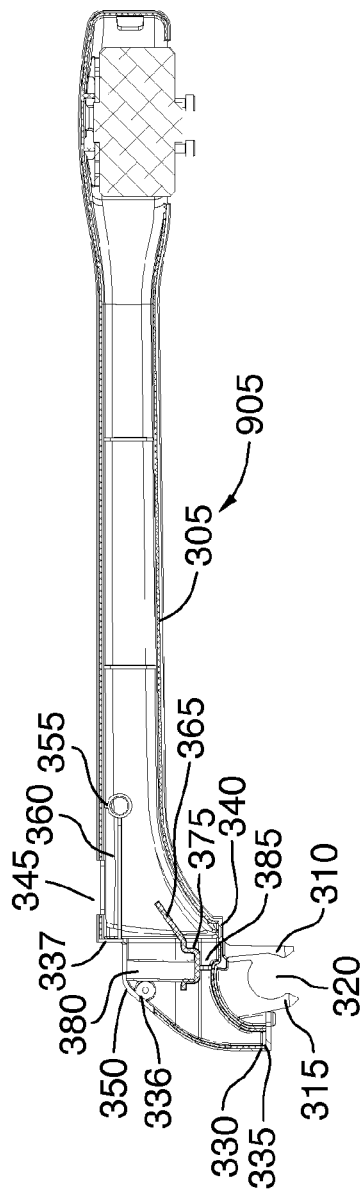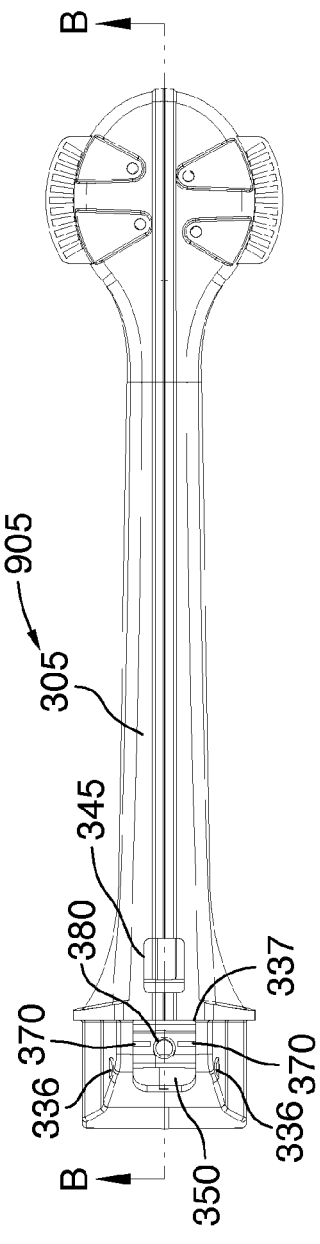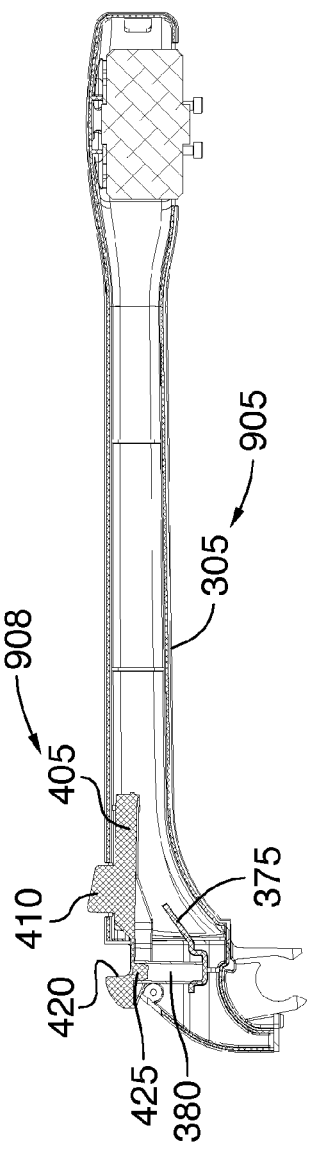

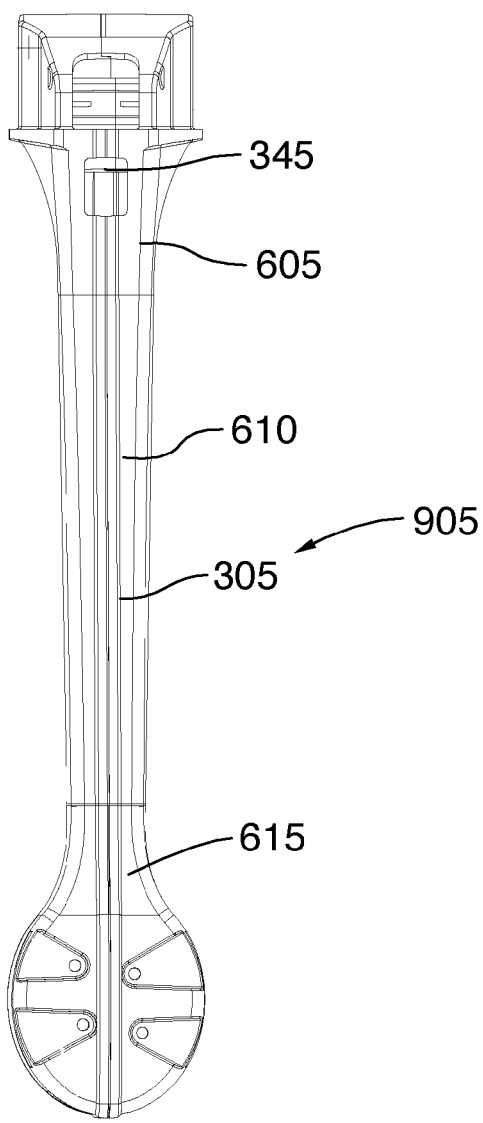
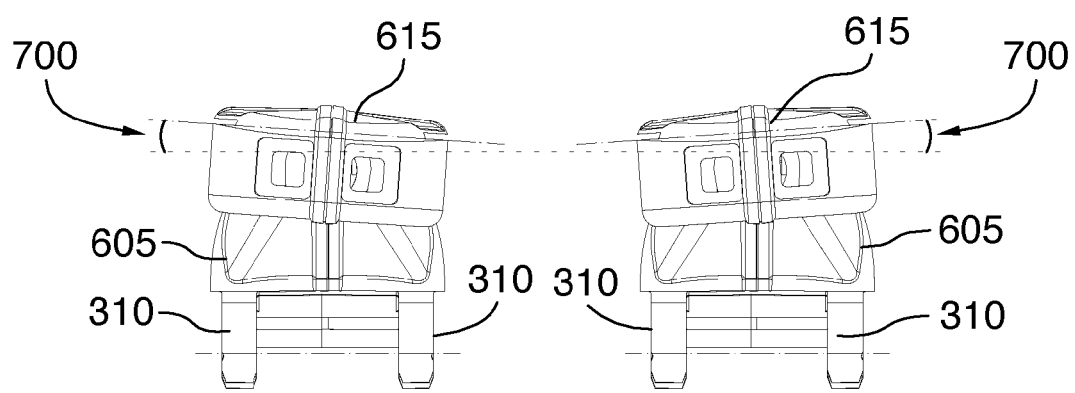
FIG.18A
FIG.18B  FIG.18C

HOVERING UNMANNED AERIAL VEHICLE

CROSS REFERENCES TO RELATED APPLICATIONS

This application filed under 35 U.S.C §371 is a national phase application of International Application Serial Number PCT/CA2013/050789 filed Oct. 17, 2013, which claims priority to U.S. Provisional Application 61/716,052, filed Oct. 19, 2012.

TECHNICAL FIELD

The technical field is generally related to hovering unmanned aerial vehicles.

SUMMARY

In an aspect, there is provided an apparatus, including a hovering unmanned aerial vehicle (HUAV). The HUAV includes an arm assembly configured to support a propeller in such a way that propeller drag of the propeller is decoupled from yaw torque control (requirements) associated with the HUAV.

In another aspect, there is provided an apparatus, including an HUAV that has an arm assembly that is field-foldable relative to the HUAV between a flight-ready state and a folded state.

In another aspect, there is provided an apparatus, including an HUAV having an arm assembly that is keyed in such a way as to facilitate a more efficient manner or style of field-assembly of the HUAV.

In another aspect, there is provided a field-removable, field-re-attachable and field-foldable instance of an arm assembly (also called a propeller arm) and/or a leg assembly for the HUAV.

In another aspect, there is provided an arm assembly which allows the decoupling of the drag characteristics of a propeller from yaw torque control (yaw control) that may be associated or linked with the HUAV.

In another aspect, there is provided a twisted propeller arm instance of an arm assembly for the HUAV, and the arm assembly decouples propeller drag from yaw torque control (yaw control) associated with the HUAV.

In another aspect, there is provided a keying of components, such as an arm assembly, of the HUAV to make field assembly straight forward and less error prone.

In another aspect, there is provided a foldable, removable and re-attachable attachment mechanism configured to attach an arm assembly and/or a leg assembly for the HUAV.

In another aspect, there is provided a system and a method for ensuring correct and easy field assembly or the replacement of an arm assembly and/or a leg assembly to the HUAV.

In another aspect, there is provided a method associated with the arm assembly and/or a field assembly of the HUAV.

In another aspect, there is provided an apparatus including a combination of at least one or more of the technical features identified or described in the summary section and/or in the detailed description section, in any configuration, and/or in any permutation and/or combination thereof that is novel over the prior art.

In another aspect, there is provided a method including any operational step and/or process identified or described in the summary section and/or in the detailed description section, in any order, using any modality either individually or in combination with any other steps and/or operation, in any configuration, and/or in any permutation and/or combination thereof that is novel over the prior art.

Other aspects are identified and provided in the claims.

Before explaining at least one embodiment in detail, it is to be understood that the aspects of the invention are not limited to the application to the details of construction and/or to the arrangements of the components set forth in the following detailed description and/or as illustrated in the drawings. The invention is capable of other aspects or embodiments and of being practiced and carried out in various ways. Furthermore, it is to be understood that the phraseology, terminology, and headings employed herein are for the description and should not be regarded as limiting. It is understood that only the claims define and restrict the scope of the invention.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 12A (Sheet 12/19) is a cross-section view of an embodiment of an arm assembly used with the HUAV of FIG. 1, in which a latch assembly is not installed;

FIG. 12B (Sheet 12/19) is an overhead view of an embodiment of the arm assembly of FIG. 12A, in which a cross-section line B-B used for FIG. 12A and FIG. 12C;

FIG. 12C (Sheet 12/19) is a cross-section view of an embodiment of the arm assembly of FIG. 12B, in which a latch assembly is installed;

FIG. 18A (Sheet 18/19) is an overhead plan view of an embodiment of a controlled-torque arm assembly to be used with the HUAV of FIG. 1;

FIG. 18B (Sheet 18/19) is an end-view of an embodiment of the controlled-torque arm of FIG. 18A having a right twist; and FIG. 18C (Sheet 18/19) is an end-view of an embodiment of the controlled-torque arm of FIG. 18A having a left twist.

Figure 1:
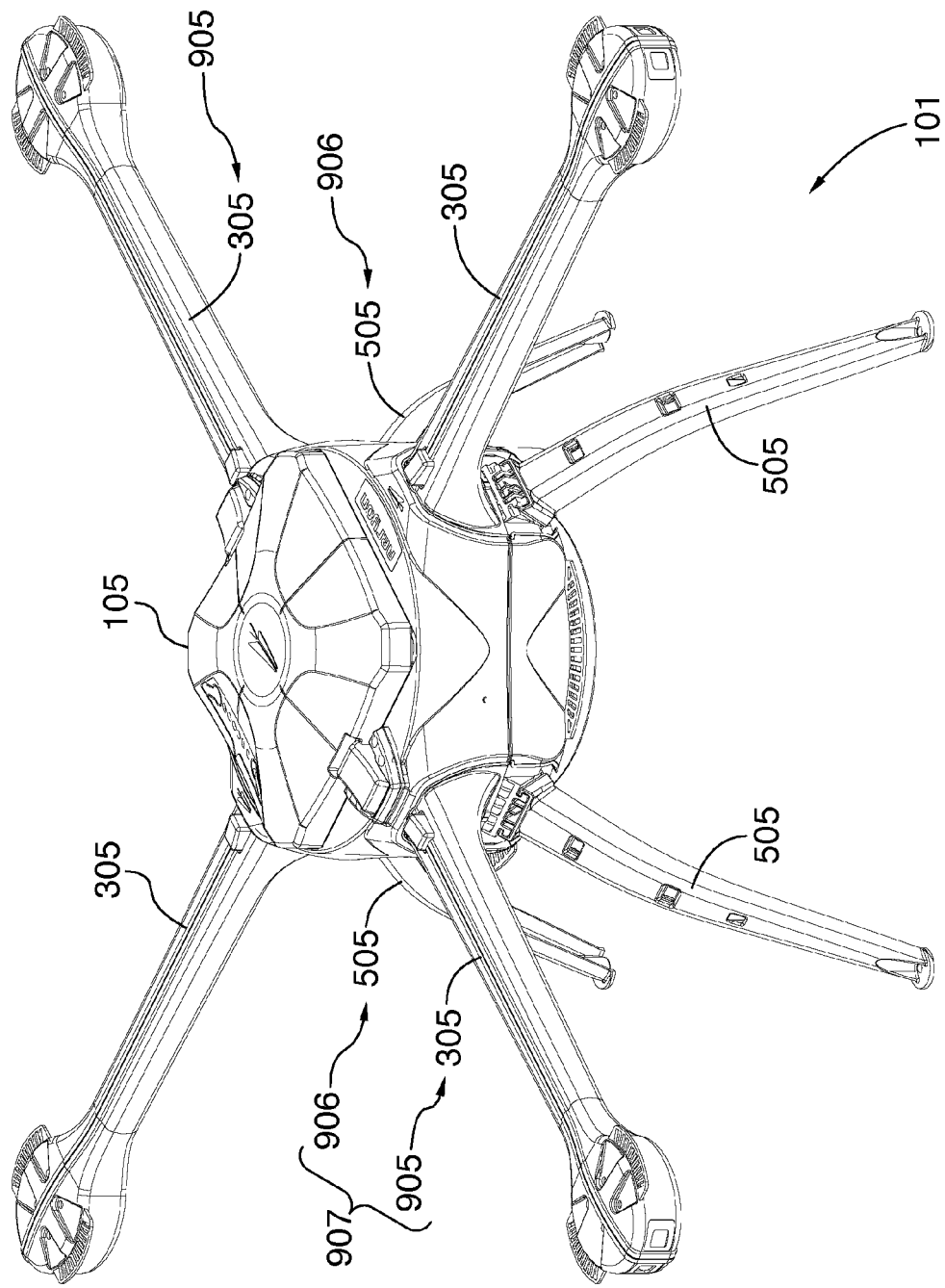
FIG. 1 (Sheet 1/19) is an isometric view of an embodiment of a hovering unmanned aerial vehicle (HUAV) in a flight-ready state.

In the drawings, embodiments of the invention are illustrated by way of example. It is to be expressly understood that the description and drawings are only for the purpose of illustration and as an aid to understanding, and are not intended as a definition of the limits of the invention.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted. Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 101 hovering unmanned aerial vehicle (HUAV)
105 hovering unmanned aerial vehicle body (HUAV body)
110 socket cavity
115 socket body
120 socket aperture
125 large-area arm stop
130 socket keying screw boss
135 keying screw boss screw aperture
140 keying screw
145 shallow-angle latching face (latching faces)
150 connector aperture
155 connector backing bracket
156 connector
160 socket side wall rib
170 arm mounting shaft
205 leg-mount body
210 leg mount rotation stop rib
215 arm engagement teeth
220 leg mounting channels
225 leg locking lip
230 leg locking depression
305 arm body
310 snap extension
315 pivot extension
320 hinge aperture
325 snap extension grooves
330 circuit board mounting face
335 circuit board
336 arm keying screw boss
337 socket engagement lip
338 mount engagement lip
340 drainage hole
345 latch button aperture
350 latching face aperture
355 latch pivot boss
360 latch pivot boss support rib
365 wire guide rib
370 spring centering ribs
375 spring pocket
380 spring
385 wire-guide channel
405 latch body
410 latch button
415 pivot pin
420 shallow-angle latching faces (latching faces)
425 spring-mounting post
505 leg body
510 leg extension
515 leg-mounting ribs
520 leg snap
605 arm base
610 arm midsection
615 arm motor head
700 alpha axis
702 axis [Yi]
704 axis [Zi]
706 normal
708 propeller
710 axis [Xi]
905 arm assembly
906 leg assembly
907 arm-and-leg folding system
908 latch assembly
909 leg-mount assembly
915 socket assembly

DETAILED DESCRIPTION OF THE EXEMPLARY EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left,"

"rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a".

Referring to FIG. 1, an example (embodiment) of a hovering unmanned aerial vehicle 101 is depicted. The hovering unmanned aerial vehicle 101 is hereafter referred to as the HUAV 101. As depicted, the HUAV 101 has four instances of an arm assembly 905 each having an arm body 305. The HUAV 101 also has four instances of a leg assembly 906 each having a leg body 505. This means that there are four instances of an arm-and-leg folding system 907 on the HUAV 101 as depicted. Each instance of the arm-and-leg folding system 907 includes at least one instance of the arm body 305 and at least one instance of the leg assembly 906. The arm assembly 905 may also be called a propeller arm assembly. The arm assembly 905 is configured to support a motor (not depicted and known) connected to a propeller (not depicted and known). Other embodiments may involve more or fewer instances of the arm-and-leg folding system 907. It will be appreciated that a different number of instances of the arm assembly 905 and/or the leg assembly 906 may be used. It is also very easy to envision an embodiment where only one instance of the arm assembly 905 and/or of the leg assembly 906 is involved (or included) in the HUAV 101, which may simplify the embodiment.

Figure 2:
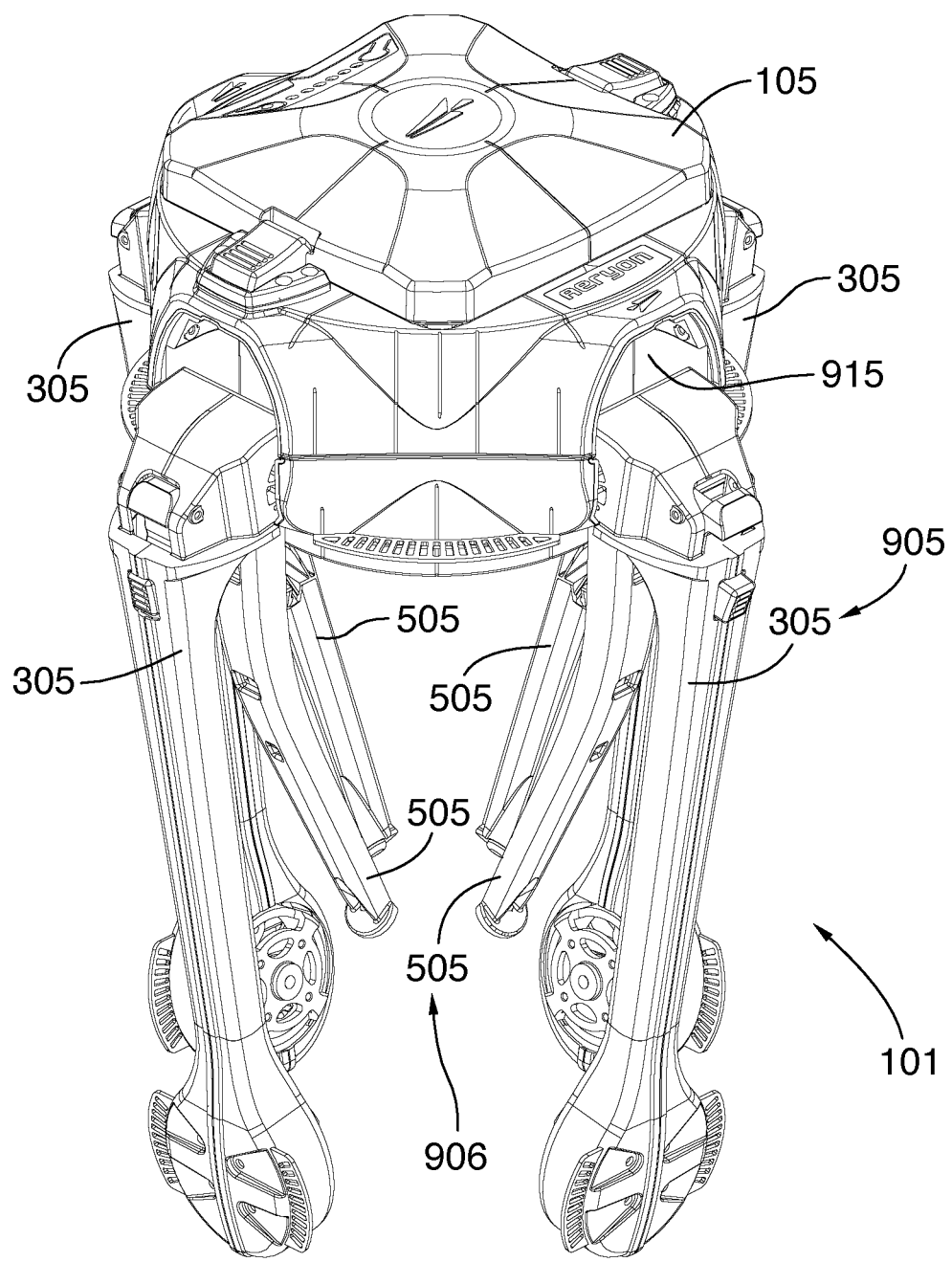
FIG. 2 (Sheet 2/19) is an isometric view of an embodiment of the HUAV of FIG. 1 in a folded state.
Figure 3:
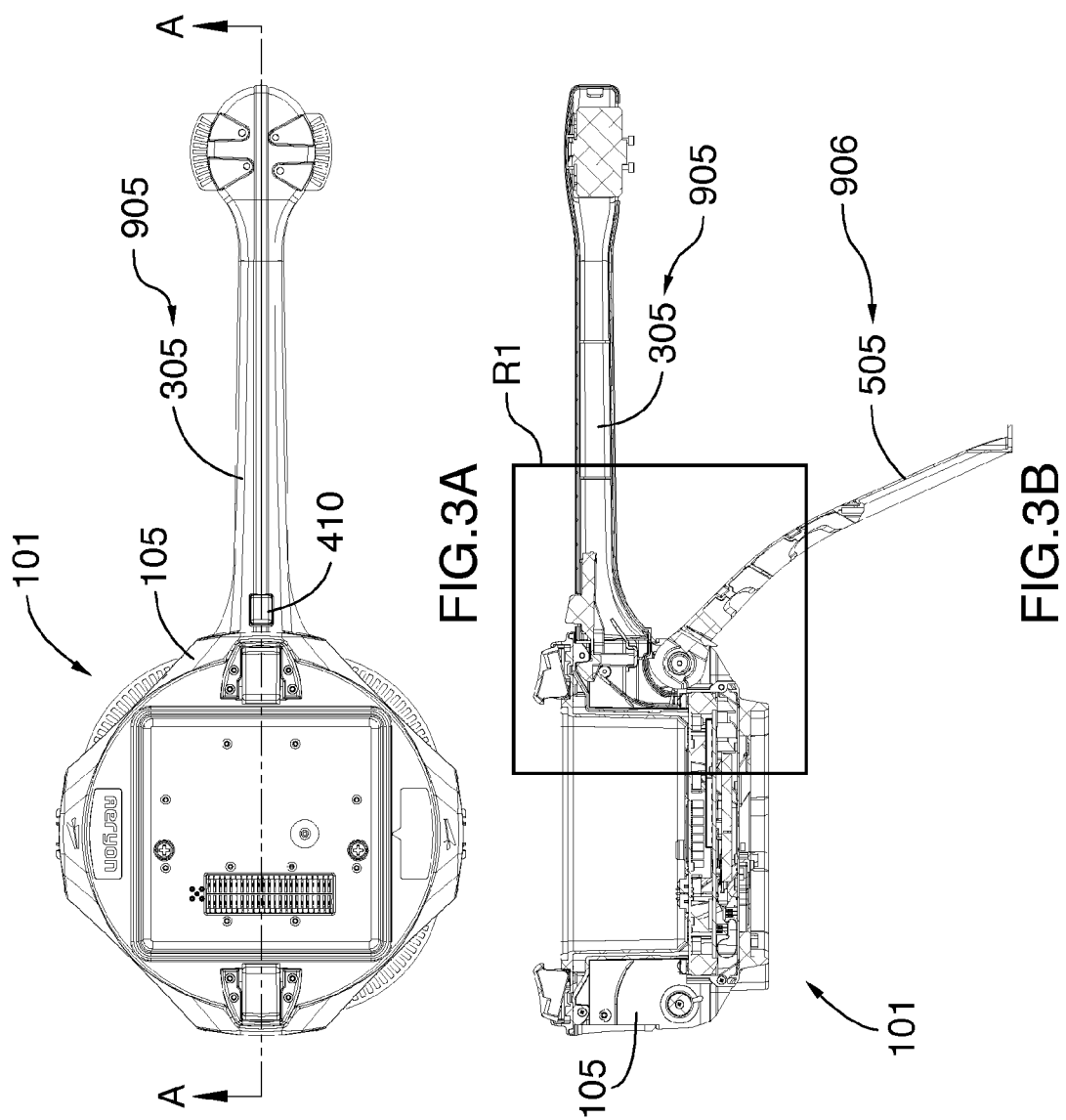
FIG. 3A (Sheet 3/19) is an overhead view of an embodiment of the HUAV of FIG. 1 in the flight-ready state, with an arm assembly and a leg assembly installed.
FIG. 3B (Sheet 3/19) is the corresponding cross-section view of an embodiment of the HUAV of FIG. 3A, viewed along a cross-section line A-A of FIG. 3A.

In one embodiment, each instance of the arm-and-leg folding system 907 includes three component assemblies. A socket assembly 915 is provided as depicted in FIG. 2. Generally, the arm assembly 905 is hingedly, moveably and/or removeably attached (connected) to the socket assembly 915 (preferably at a first end of the socket assembly 915). A leg assembly 906 is hingedly, moveably and/or removeably attached to the socket assembly 915 (preferably at a first end of the socket assembly 915). The definition of "hingedly" is a first object is attached to a second object by way of a hinge mechanism, which is a type of bearing that connects two objects and allows an angle of rotation between the two objects. Two objects connected by the hinge mechanism may rotate relative to each other about a fixed axis of rotation. The hinge mechanism may be made of flexible material or of moving components. The definition of "movable" is a first object is movable relative to a second object. The definition of "removable" is a first object may be moved or taken away from a second object and/or a place.

In one embodiment of the HUAV 101, the instances of the arm assembly 905 and the instances of the leg assembly 906 are held in place (relative to the HUAV 101) without folding during: (A) a flight operation of the HUAV 101 (for instance, while the HUAV 101 is buffeted by winds during flight), and/or (B) a landing operation of the HUAV 101, and/or other flight operations and/or states, such as take-off, hovering, rising altitude, falling altitude, forward motion, reverse motion, sideways motion, rotation motion while hovering, etc. The state of the HUAV 101 depicted in FIG. 1 is called a flight-ready state. The HUAV 101 is also configured to allow the instances of the arm assembly 905 and/or the instances of the leg assembly 906 to be independently removed for transport and/or storage of the HUAV 101, and this state is called a removed state (depicted in FIG. 9) of the HUAV 101. Additionally, the instances of the arm assembly 905 and/or the instances of the leg assembly 906 may be folded down away from their normal positions (operational or deployment positions depicted in FIG. 1), for transport and/or storage of the HUAV 101, and this state is called a folded state (depicted in FIG. 2) of the HUAV 101.

Socket Assembly 915

Figure 6:
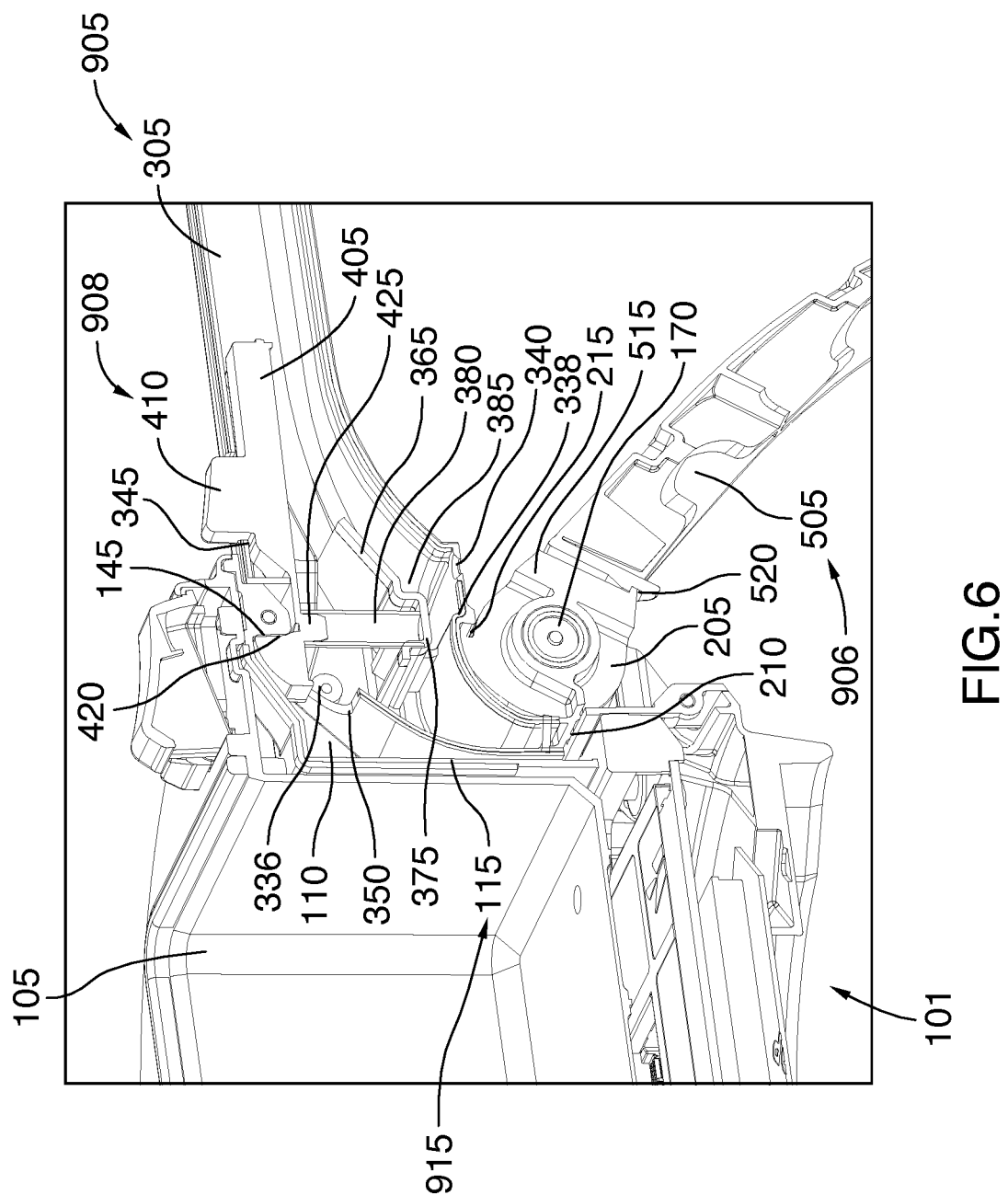
FIG. 6 (Sheet 6/19) is a detailed view of an embodiment of the HUAV in a region R2 of FIG. 5.

Referring to FIG. 6, in one embodiment, each instance of the arm assembly 905 has the arm body 305. The arm assembly 905 is installed into its own instance of the socket assembly 915. The socket assembly 915 has a socket body 115. The socket body 115 is positioned on a hovering unmanned aerial vehicle body 105 of the HUAV 101. The hovering unmanned aerial vehicle body 105 is hereafter referred to as the HUAV body 105. In the present embodiment, a socket cavity 110 is formed in the HUAV body 105. The socket body 115 (a separate part) is received and is installed into the socket cavity 110. However, in an alternative embodiment, the socket body 115 and its constituent parts may be formed directly as part of the HUAV body 105.

Figure 4:
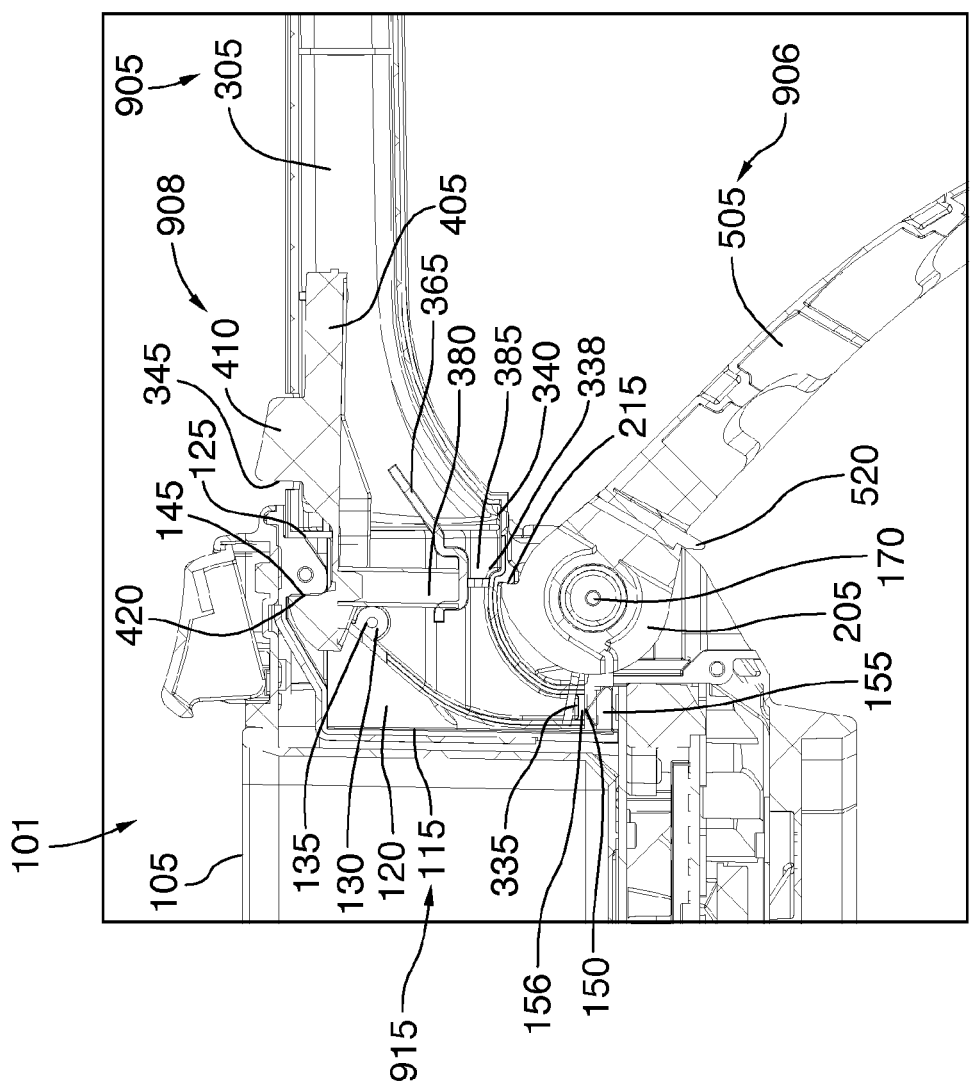
FIG. 4 (Sheet 4/19) is a detailed cross-section view of an embodiment of the HUAV in a region R1 of FIG. 3B.

Referring to FIG. 4, in one embodiment, a connector 156 is inserted through a connector aperture 150 in the socket body 115. The connector 156 is held in place from below with the connector backing bracket 155, which is mounted to the socket body 115. In one embodiment, the connector 156 is configured to transmit and receive signals and/or transmit power, to the propeller motors (known and not depicted) to be mounted in the instances of the arm assembly 905. In one embodiment, this may be accomplished through contacting the connector 156 (depicted in FIG. 7) with a circuit board 335 (depicted in FIG. 12A) positioned in the arm assembly 905, so that an electrical connection is facilitated to the propeller motors to be mounted to the instance of the arm assembly 905. Alternative embodiments, such as sliding friction connectors, wired pins and sockets, or other systems, will be apparent to those skilled in the art.

In view of the description and the FIGS., in general terms, there is provided an apparatus including (and not limited to) an HUAV 101. The HUAV 101 includes (and is not limited to) a socket assembly 915 configured to facilitate attachment of an arm assembly 905 and/or a leg assembly 906 relative to the HUAV 101. In accordance with an option, the apparatus may further include a socket assembly 915, and the socket assembly 915 may include a socket body 115 configured to affix into a socket cavity 110 formed on a first side of the HUAV body 105 as depicted in FIG. 6. In accordance with an option, the HUAV body 105 and the socket assembly 915 form a unitary unit being formed from a piece of material (molded from a single piece of material).

Other options for the apparatus as identified in this paragraph may include any combination and/or permutation of the technical features (assemblies, components, items, devices, etc.) as identified in the detailed description, as may be required and/or desired to suit a particular technical purpose and/or technical function. It will be appreciated that the socket assembly 915 may be provided and/or sold to the end user as a replacement part and/or with the HUAV body 105 (as may be required).

Arm Assembly 905

Figure 13:
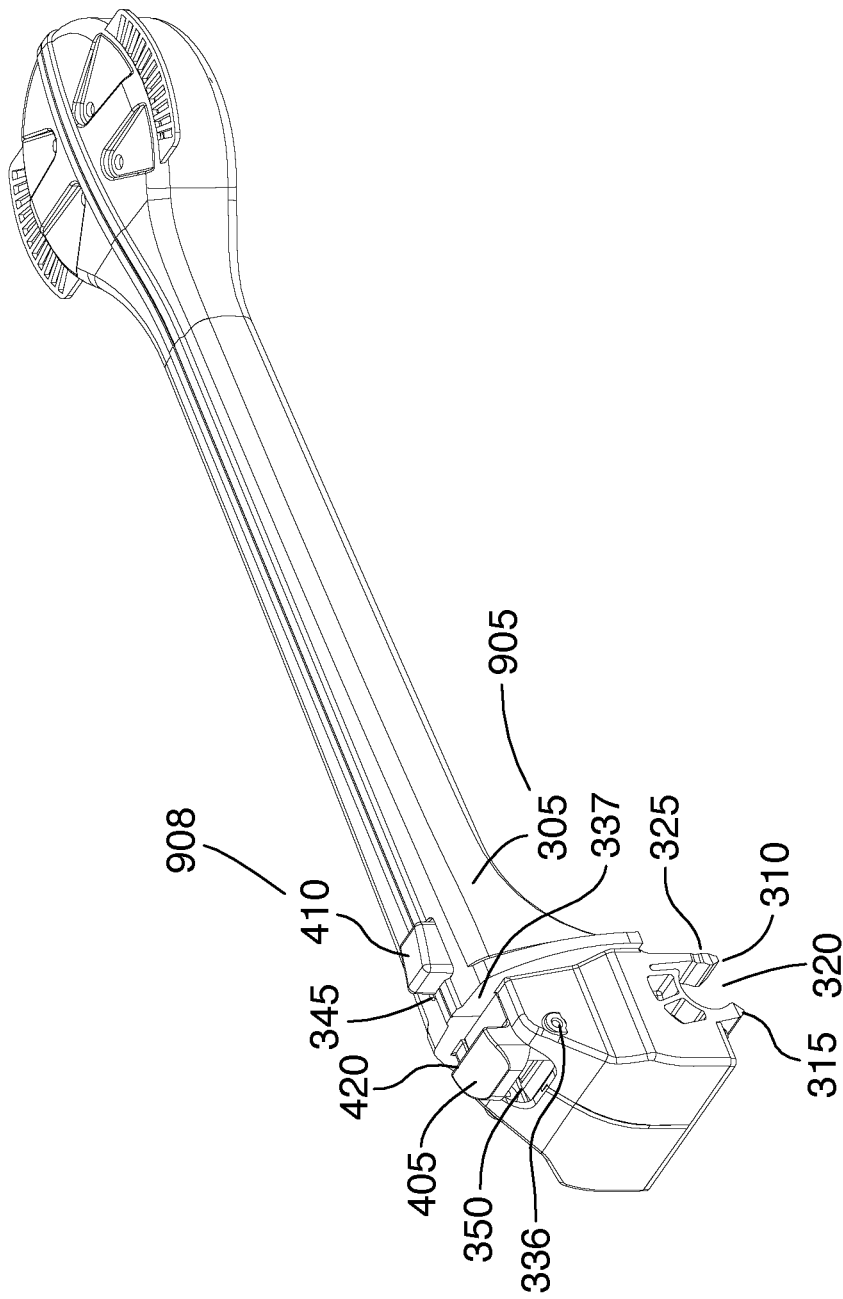
FIG. 13 (Sheet 13/19) is an isometric view of a top side of an embodiment of the arm assembly of FIG. 12A.

Generally referring to FIGS. 1 to 17, and with specific reference to FIG. 4 in one embodiment, in the flight-ready state, the arm body 305 of the arm assembly 905 holds onto the arm mounting shaft 170 by pivotally and/or rotatably gripping the arm mounting shaft 170 in the hinge aperture 320 (depicted in FIG. 12A and FIG. 13), which is formed between the pivot extension 315 and the snap extension 310 (both depicted in FIG. 12A). The spring 380 (depicted in FIG. 12A) applies force onto the latch body 405 (depicted in FIG. 12C) of a latch assembly 908, which keeps the spring 380 pressed up (in a compressed state), and keeps the shallow-angle latching face 420 of the latch body 405 pressed against the shallow-angle latching face 145 (depicted in FIG. 4) of the socket assembly 915, holding the arm assembly 905 in place as depicted in FIG. 4. Generally, the latch assembly 908 is configured to latchably connect and latchably disconnect the arm mounting shaft 170 with the arm assembly 905. The shallow-angle latching faces 145, 420 are able to prevent the arm assembly 905 from moving during flight because the shallow angle on the latching faces 145, 420 causes the vertical force of the spring 380 to be converted into a larger normal force on the shallow-angle latching faces 145, 420. The latch pivot boss support rib 360 (depicted in FIG. 12A) is compressed when the arm assembly 905 is in the flight-ready state, preventing the latch pivot boss 355 (depicted in FIG. 12A) from taking all of the normal force of the spring 380 upon itself. The socket engagement lip 337 (depicted in FIG. 12B) of the arm assembly 905 abuts the large-area arm stop 125 (depicted in FIG. 8) of the socket body 115, allowing the normal force from the spring 380 to be distributed around a wide area and preventing the arm assembly 905 from wobbling during operation.

In general terms, the socket assembly 915 further includes the arm mounting shaft 170 spanning across the socket body 115, and the arm mounting shaft 170 is configured to interface with the arm assembly 905. The socket assembly 915 further includes a leg-mount assembly 909 mounted rotatably onto the arm mounting shaft 170, and the leg-mount assembly 909 is configured to interface with a leg assembly 906.

Referring to FIG. 12A, FIG. 12B and FIG. 12C, the spring 380 is held in place on one end by the spring-mounting post 425 on the latch body 405 of the latch assembly 908, and on the other end by the spring pocket 375. The spring 380 is prevented from moving laterally by the spring centering ribs 370.

Figure 8:
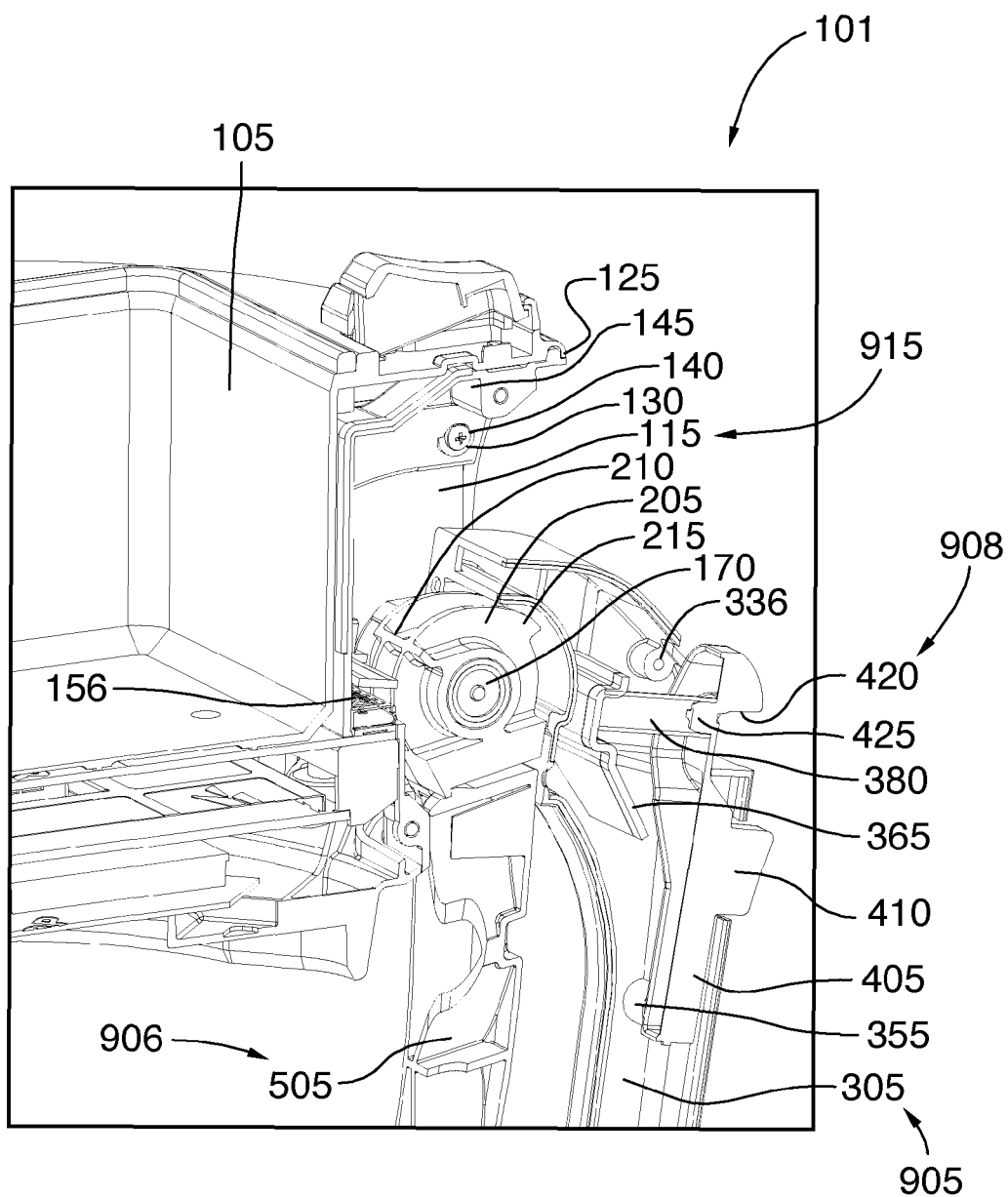
FIG. 8 (Sheet 8/19) is a detailed view of an embodiment of the HUAV in a region R3 of FIG. 7.

Referring to FIG. 8, when the arm assembly 905 (having the arm body 305) is to be rotated into the folded state (depicted in FIG. 2), the latch button 410 of the latch assembly 908 is depressed, which removes the latching force from the shallow-angle latching faces 420, 145, and allows the arm assembly 905 to pivot downward around the arm mounting shaft 170. When the arm assembly 905 has pivoted far enough so that the latching face 420 of the latch assembly 908 has cleared the latching face 145 of the socket body 115 of the socket assembly 915, the latch button 410 may be released. Once the arm assembly 905 is pivoted to its folded state (depicted in FIG. 2), the snap extension grooves 325 (depicted in FIG. 13) catch at least one instance of the socket side wall rib 160 (depicted in FIG. 5); this provides a gentle retaining force to keep the arm assembly 905 in the folded state (depicted in FIG. 2) while allowing the arm assembly 905 to be easily pivoted back up into the flight-ready state (depicted in FIG. 1).

Referring to FIG. 12A, to remove the arm assembly 905, the arm assembly 905 is pivoted partly between the flight-ready state (depicted in FIG. 1) and the folded state (depicted in FIG. 2). When this is the case, a force is applied to the end of the arm assembly 905 mounted in the socket assembly 915 (depicted in FIG. 9), in which the force may be in line with the line from the center of the arm mounting shaft 170 (depicted in FIG. 9) to the center of the hinge aperture 320 (depicted in FIG. 12A). The force that is applied causes the pivot extension 315 (depicted in FIG. 12A) and the snap extension 310 to disengage from the arm mounting shaft 170 of the socket assembly 915 (depicted in FIG. 9).

Referring to FIG. 12A, in wet weather, rain may fall into the arm assembly 905 through the latch button aperture 345 around the latch button 410. If this water were to pool around the circuit board 335 (depicted in FIG. 4), the water may lead to contact corrosion and premature failure of the circuit board 335 or of the connector 156 (depicted in FIG. 4 and FIG. 9). A drainage hole 340 (formed in the arm assembly 905) allows the water to flow directly out and not pool near the connector 156 and/or the circuit board 335. Of course, a gasket or seal may be installed at the latch button aperture 345 if so desired.

Figure 9:
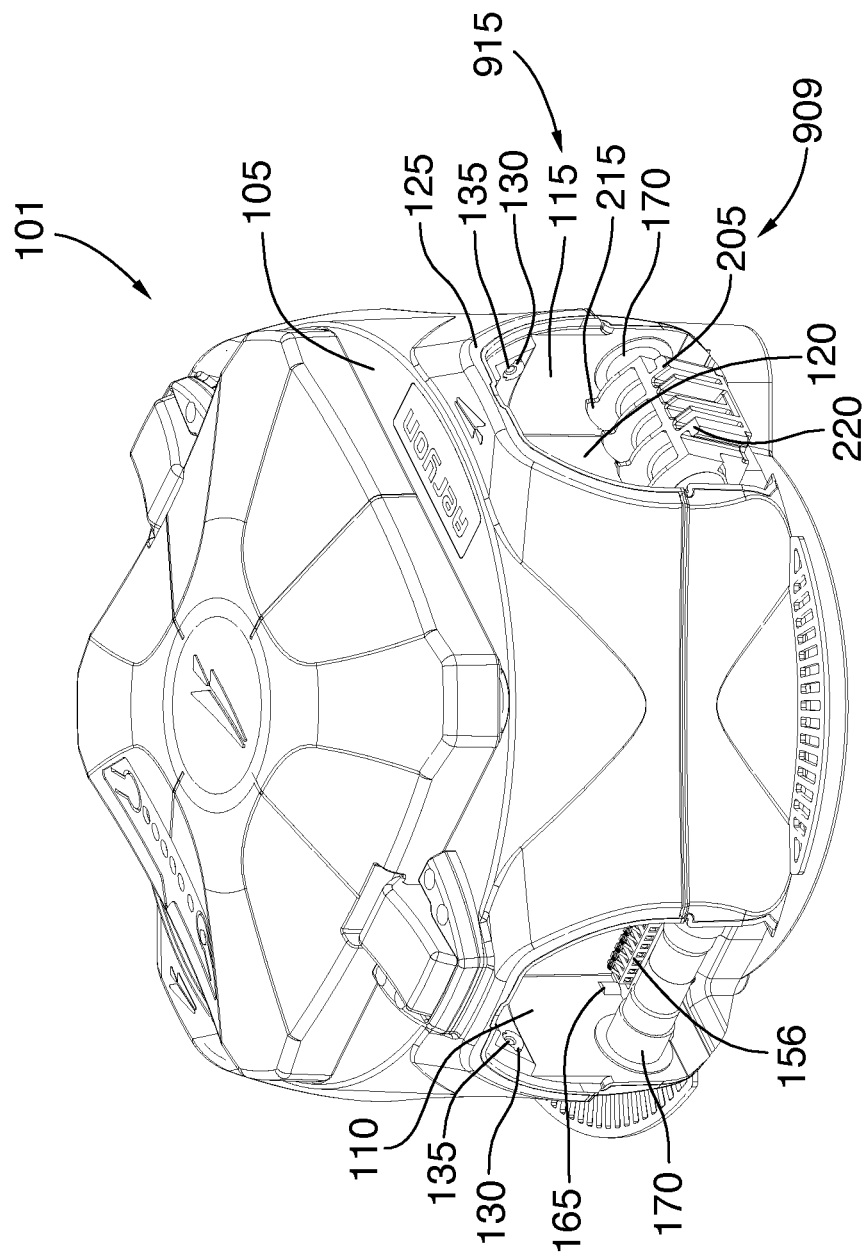
FIG. 9 (Sheet 9/19) is an isometric view of the HUAV of FIG. 1, in which the HUAV is in a removed state.

Referring to FIG. 4, the wires pass within the arm body 305 from the motor assembly to the connector 156 (as depicted in FIG. 4 and FIG. 9) via the circuit board 335, and also pass underneath the wire guide rib 365, through the wire-guide channel 385 under the wire guide rib 365. This setup allows easier routing of wires, routing the wires away from the latch body 405 and the spring 380, thus reducing the chances of binding, pinching or wire damage.

In view of the description, in general terms (in view of the FIGS.), there is provided an apparatus including (and not limited to) an HUAV 101. The HUAV 101 includes (and is not limited to) an arm assembly 905 that is field-foldable relative to the HUAV 101 between a flight-ready state and a folded state. As an option, the arm assembly 905 may be moved from the folded state to a removed state. Other options for the apparatus as identified in this paragraph may include any combination and/or permutation of the technical features (assemblies, components, items, devices, etc.) as identified in the detailed description, as may be required and/or desired to suit a particular technical purpose and/or technical function. It will be appreciated that the arm assembly 905 may be provided and/or sold to the end user as a replacement part and/or with the HUAV body 105 (as may be required).

Leg Assembly 906

Referring to FIGS. 1 to 17, in one embodiment, to go from the flight-ready state (depicted in FIG. 1) to the folded state (depicted in FIG. 2), the leg assembly 906 (depicted in FIG. 8) moves through a smaller angle than the angle that the arm assembly 905 moves through. This is accomplished through mounting the leg body 505 onto the leg-mount body 205 (depicted in FIG. 4), which can freely rotate around the arm mounting shaft 170 (depicted in FIG. 4), which is bounded by (A) the leg mount rotation stop rib 210 (depicted in FIG. 6) contacting the socket rotation stops 165 (depicted in FIG. 9), and by (B) the leg snap 520 (depicted in FIG. 17) contacting the socket body 115 of the socket assembly 915 (depicted in FIG. 9).

Figure 10:
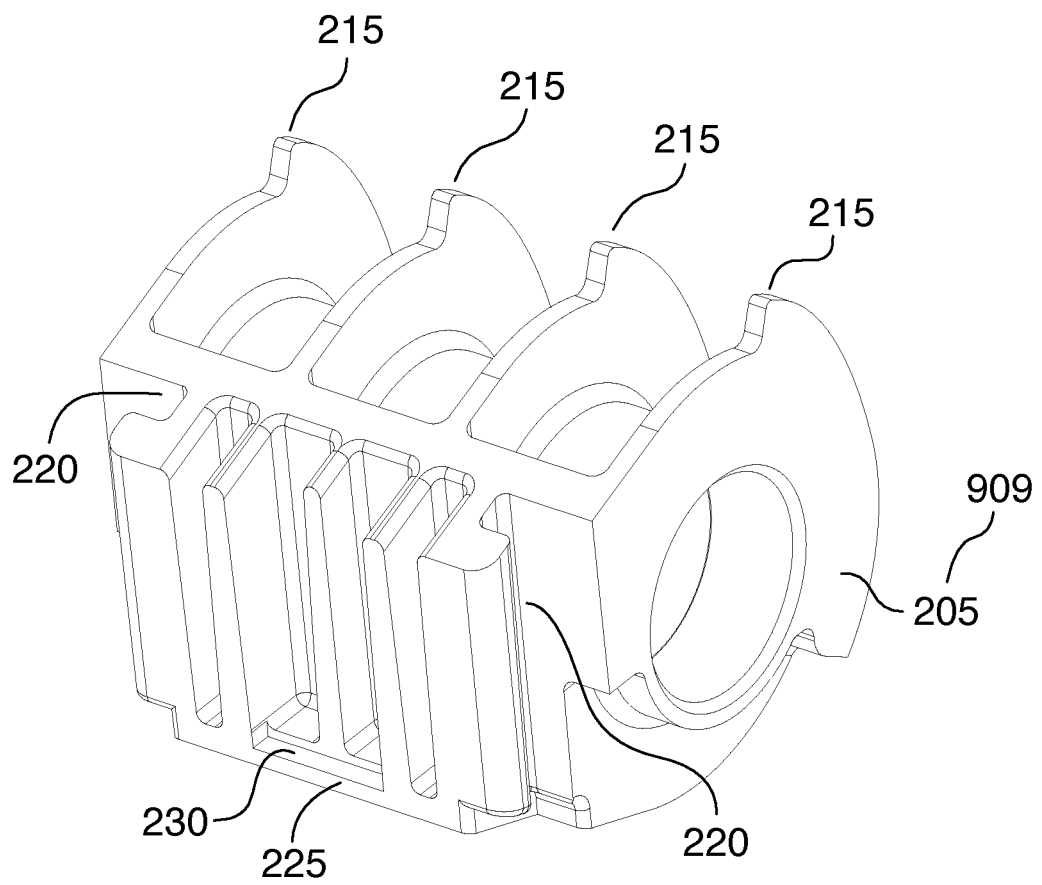
FIG. 10 (Sheet 10/19) is an isometric view of an embodiment of a leg-mount assembly from a first side, and the leg-mount assembly is used with the HUAV of FIG. 1.
Figure 17:
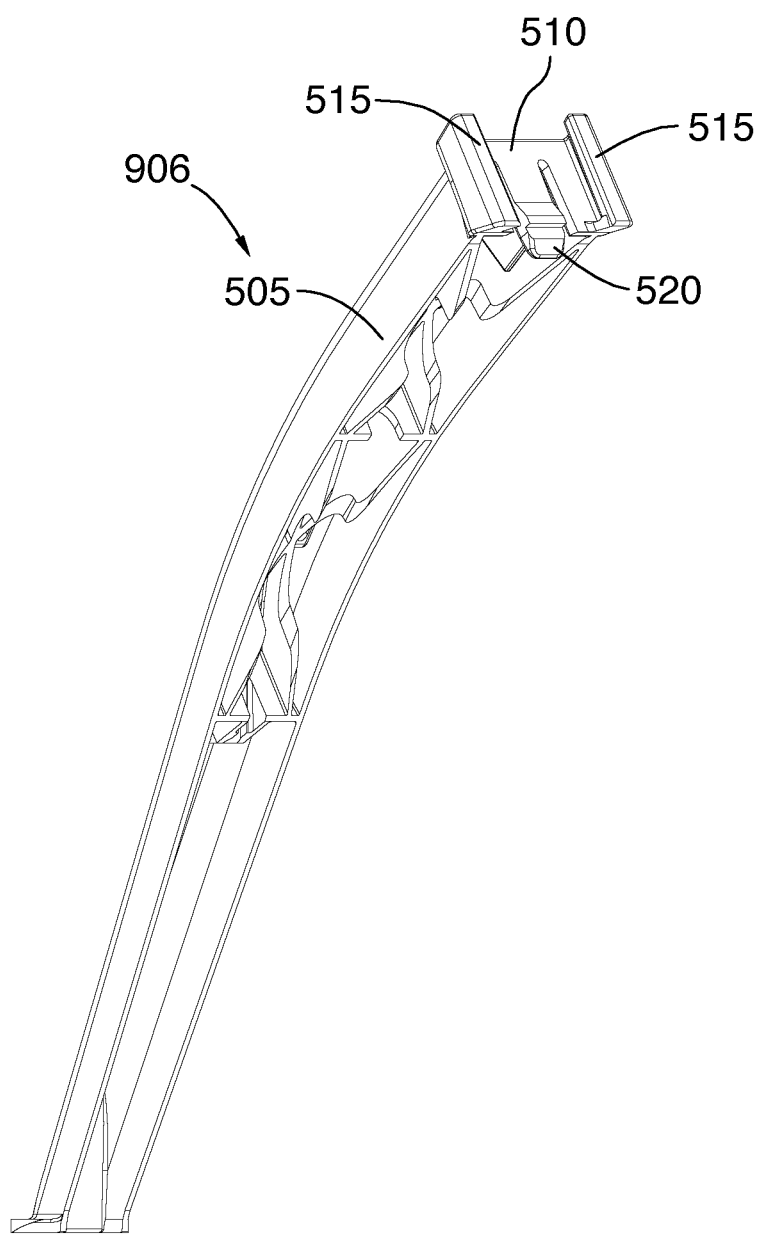
FIG. 17 (Sheet 17/19) is an isometric view of a first side of an embodiment of a leg assembly to be used with the HUAV of FIG. 1.

Referring to FIG. 17, the leg assembly 906 is mounted onto the leg-mount body 205 (depicted in FIG. 10) by sliding the leg-mounting ribs 515 (depicted in FIG. 17) into the leg mounting channels 220 (depicted in FIG. 10) of the leg-mount body 205 until the leg snap 520 (depicted in FIG. 17) snaps into place in the leg locking depression 230 (depicted in FIG. 10) against the leg locking lip 225 (depicted in FIG. 10). The leg assembly 906 may be removed by manually disengaging the leg snap 520 from the leg locking lip 225 (depicted in FIG. 10), and then pulling the leg-mounting ribs 515 out from the leg mounting channels 220.

Referring to FIG. 8, the leg-mount body 205 rotates freely around the arm mounting shaft 170 (bounded as described above) only when there is no instance of the arm assembly 905 mounted in the socket assembly 915. The natural tendency is for gravity to pull the leg body 505 downward (into the folded state), and for the leg-mount body 205 to rotate to allow this tendency to happen (once unlatched).

Figure 5:
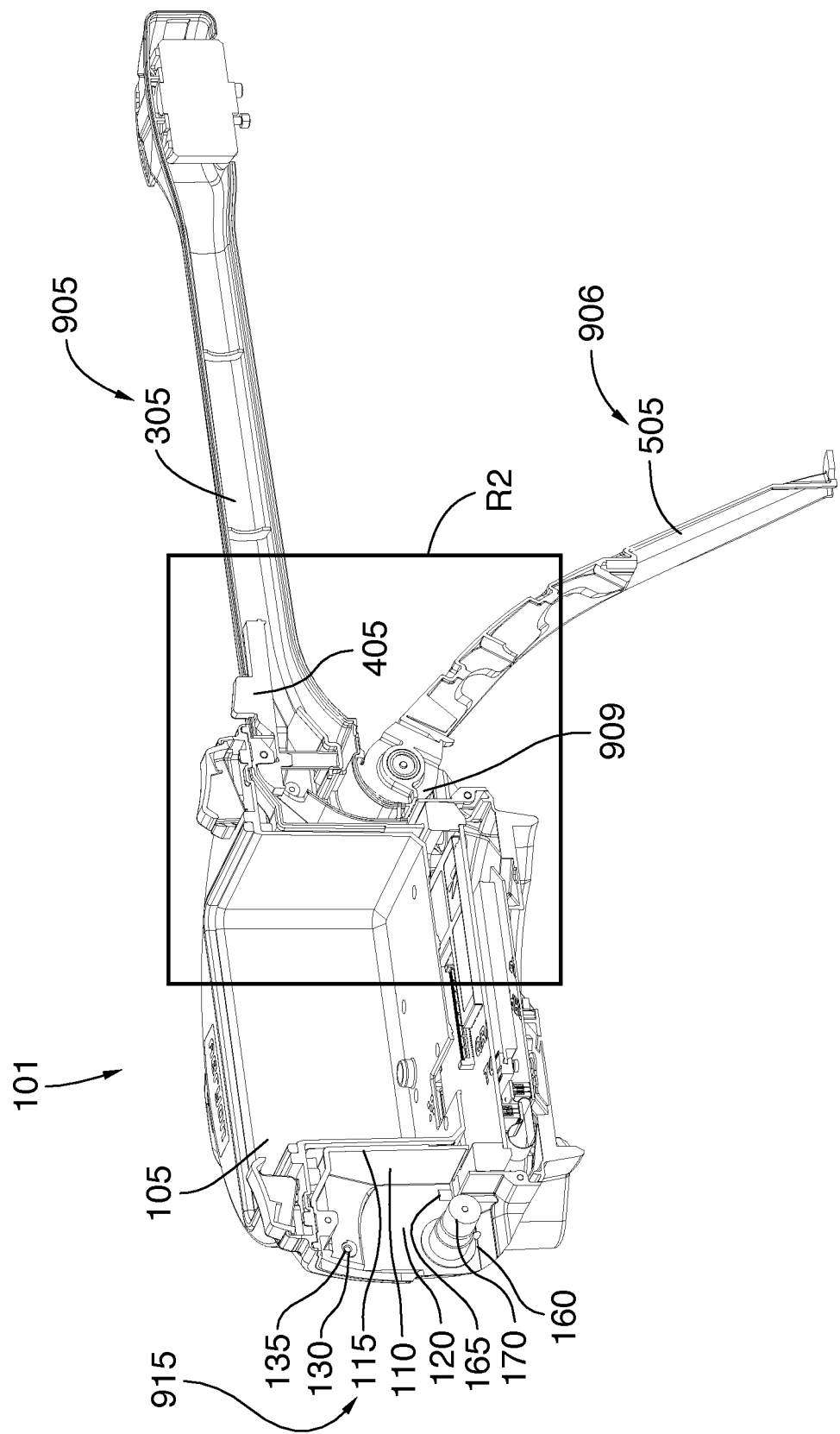
FIG. 5 (Sheet 5/19) is an isometric cutaway view of an embodiment of the HUAV of FIG. 3A, in the flight-ready state, with the cutaway sectioned along a cross-section line A-A of FIG. 3A.
Figure 7:
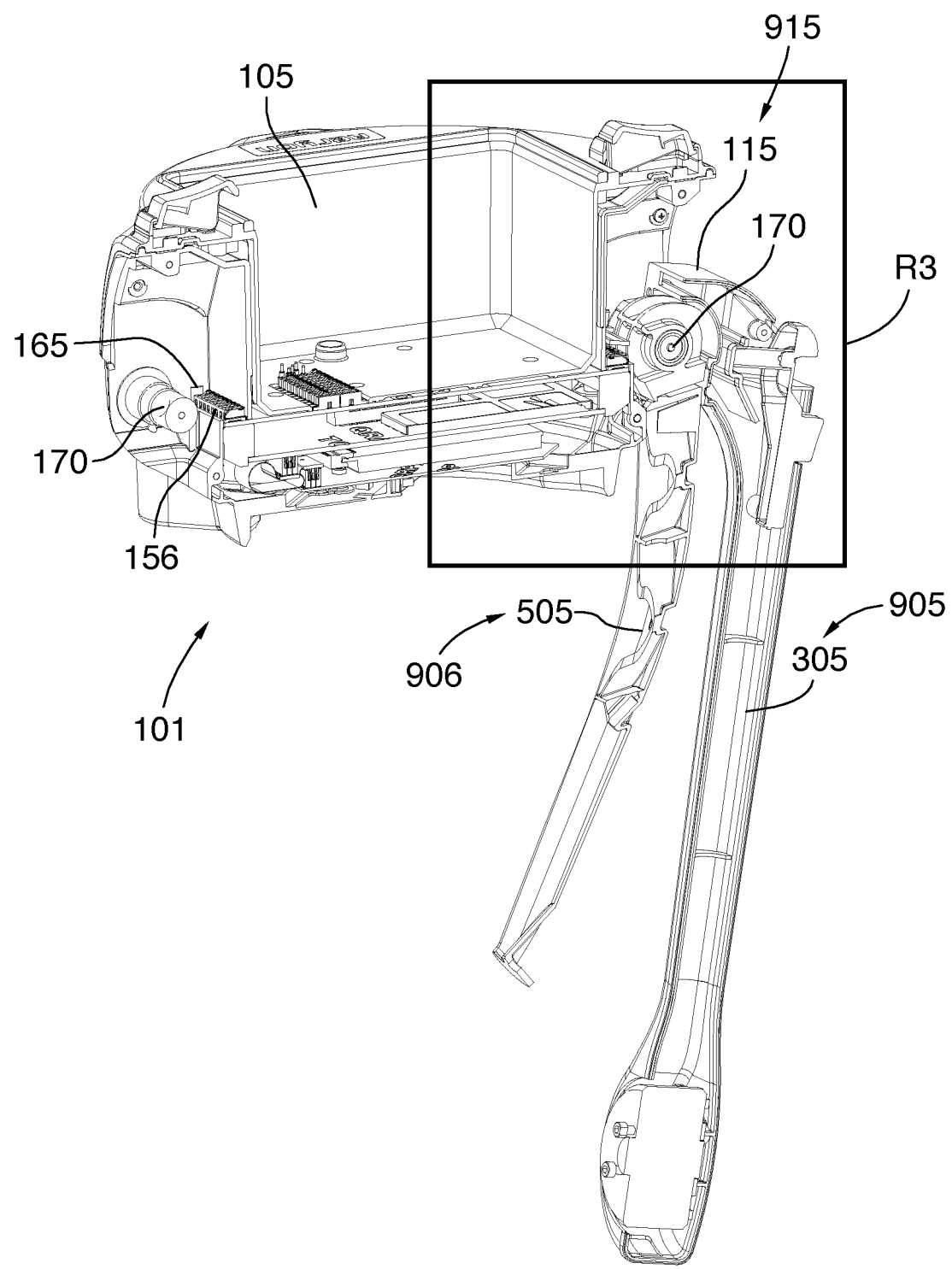
FIG. 7 (Sheet 7/19) is an isometric cutaway view of an embodiment of the HUAV of FIG. 3A, in the folded state, with the cutaway sectioned along a cross-section line A-A of FIG. 3A.
Figure 14:
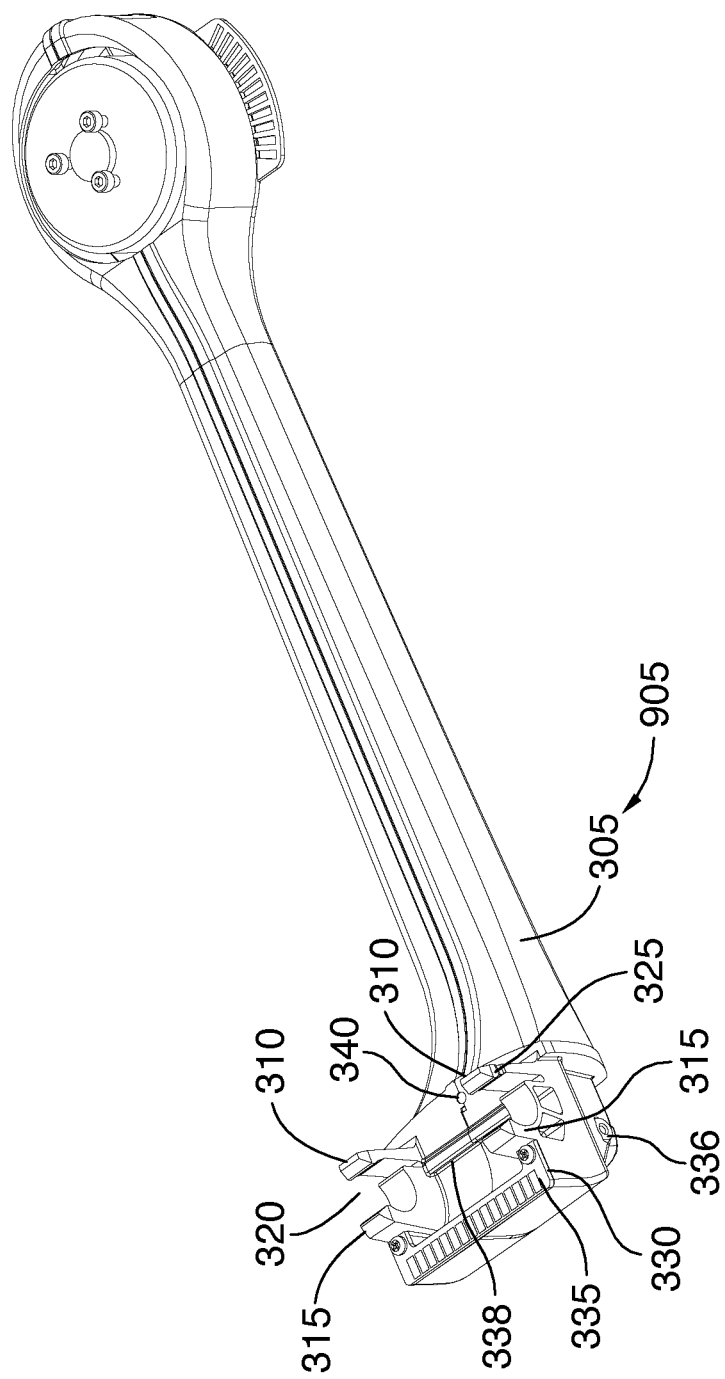
FIG. 14 (Sheet 14/19) is an isometric view of a bottom side of an embodiment of the arm assembly of FIG. 12A.

Referring to FIG. 14 and FIG. 10, when the arm assembly 905 (depicted in FIG. 14) is mounted (as described above) and is in the flight-ready state, the mount engagement lip 338 (depicted in FIG. 14) of the arm assembly 905 catches against the arm engagement teeth 215 (depicted in FIG. 10) on the leg-mount body 205 (depicted in FIG. 10), preventing the leg-mount body 205 from rotating. When the arm assembly 905 is folded down, the arm engagement teeth 215 prevent the leg-mount body 205 from folding down at a faster rotational speed than the arm assembly 905. In moving from the flight-ready state to the folded state, the arm assembly 905 moves through a larger rotation angle than the leg assembly 906 (as depicted in FIG. 5 and FIG. 7), so after the arm assembly 905 moves past a certain folding angle (when the leg assembly 906 reaches the folded state), the mount engagement lip 338 of the arm assembly 905 no longer catches against the arm engagement teeth 215, and the arm assembly 905 continues to rotate toward the folded state without moving the leg assembly 906.

Referring to FIG. 14 and FIG. 10, when the arm assembly 905 is subsequently folded back up from the folded state into the flight-ready state, the arm assembly 905 rotates freely until the mount engagement lip 338 of the arm assembly 905 catches the arm engagement teeth 215, which causes the leg-mount body 205 to begin to rotate with the arm assembly 905, causing the leg assembly 906 to fold up toward the flight-ready state.

Referring to FIG. 10, an alternate embodiment would feature a face on the arm engagement teeth 215 of the leg-mount body 205 which would act as a stopping face, to allow the leg assembly 906 (depicted in FIG. 5) to remain in the flight-ready state even without the arm assembly 905 installed. This would cause the relative rotational angles between the arm assembly 905 and the leg assembly 906 to change during the folding and unfolding processes, but does not materially affect the overall operation of the HUAV 101.

Referring to FIG. 12A and FIG. 9, the circuit board 335 (depicted in FIG. 12A) is aligned directly in line with the axis of rotation when the arm assembly 905 is attached, meaning that the plane of the circuit board 335 passes through the axis of rotation of the arm assembly 905. When the arm assembly 905 is folded into the flight-ready state, because of this specific placement of the circuit board 335 in the arm assembly 905, the circuit board 335 (depicted in FIG. 12A) contacts the spring contacts of the connector 156 (depicted in FIG. 9) perpendicularly, to reduce the shear wear on the circuit board 335 and the connector 156.

Controlled-Torque Instance of Arm Assembly 905

On propeller-equipped vehicles, a drag force is present on each rotating propeller, due to friction between the propeller and air. This drag force (also called a drag torque) can be measured at a propeller shaft as a torque about an axis of rotation, and is in an opposite direction to the direction of rotation. This drag torque in turn acts on the body holding the propeller (such as the arm body 305 of the arm assembly 905), and causes (imparts) a body torque on the arm assembly 905 opposed to a direction of propeller rotation.

This body torque may be easily managed by having two instances of a propeller of the of the HUAV 101 turn (rotate) in a direction, and the other two instances of the propeller turn in an opposite direction (in another direction). However, since the torques are deliberately cancelled, the energy needed to create the torques is going to waste; this manifests as a decrease in propeller efficiency, causing decreased flight performance (less lift force given a certain amount of motor power) and decreased flight time (more battery power used for a certain flight time). A side benefit, however, is that by varying motor speeds appropriately, the yaw motion of the HUAV 101 may be easily controlled (by allowing the torque in one direction to not completely cancel the torque in another direction).

For the case where the efficiency of the propellers is increased considerably and where the air drag on the propellers is decreased, flight performance and flight time may increase as well. However, without sufficient body torque from the air drag, yaw torque control (of the HUAV 101) may become difficult.

Figure 19A:
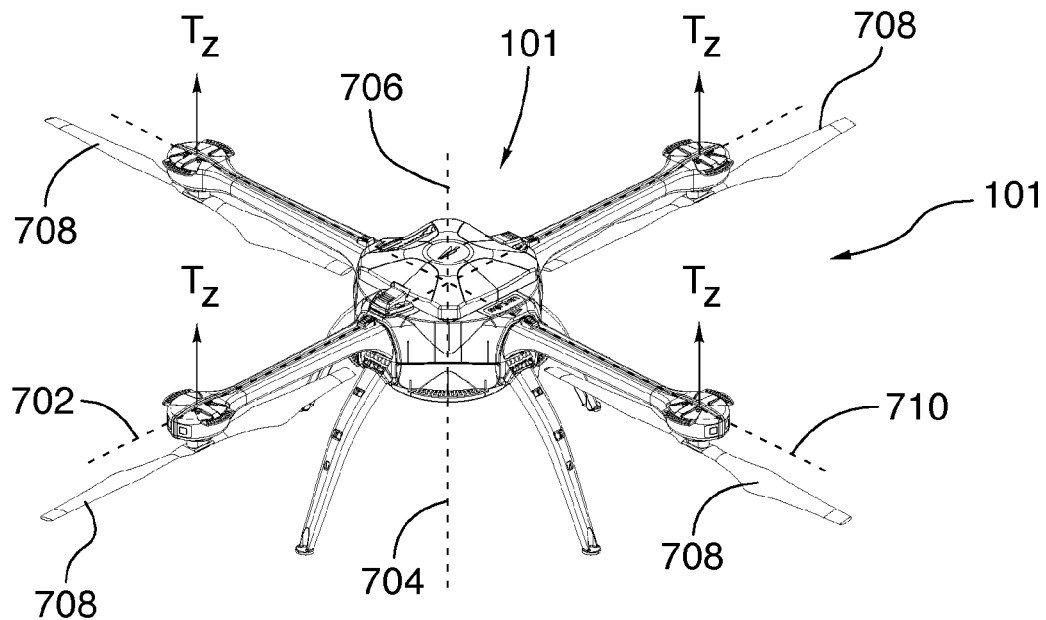
FIG. 19A (Sheet 19/19) is an isometric view of an embodiment of an HUAV with high-efficiency propellers and non-twisted, non-controlled torque arms, showing force vectors generated during flight.
Figure 19B:
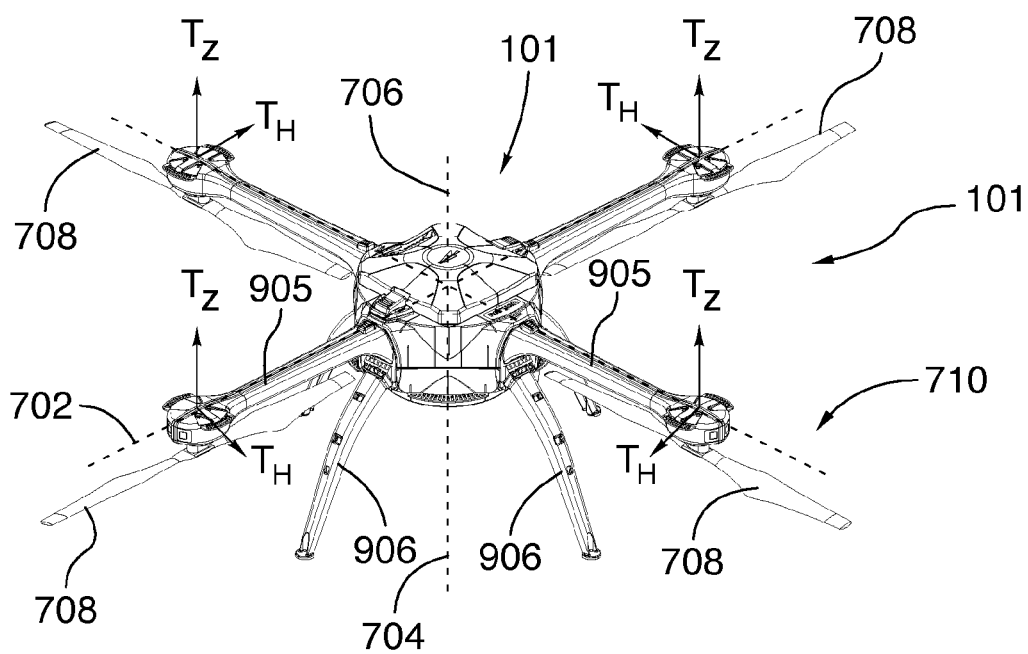
FIG. 19B (Sheet 19/19) is an isometric view of an embodiment of an HUAV with high-efficiency propellers and an embodiment of twisted, controlled-torque arms, showing force vectors generated during flight.

Referring to FIG. 18A, the propellers and motors (which motors are contained within the arm motor head 615 depicted in FIG. 18A) are mounted at a pre-determined angle to normal, about an arm axis longitudinally extending through the arm assembly 905. The arm axis is defined, for each arm assembly 905, as the axis extending along the horizontal plane, in which the arm axis extends from the centre of the HUAV body 105 toward the end of the arm assembly 905 positioned furthest from the HUAV body 105. The normal is oriented at a right angle to the horizontal plane. The pre-determined angle about the arm axis may be referred to as an alpha angle. Generally, the arm assembly 905 is configured to support a propeller at the alpha angle relative to normal. This is done in such a way that the propeller generates a body torque sufficient to allow improved yaw control of the hovering unmanned aerial vehicle. The normal is defined as a line that extends at a right angle (90 degrees) to the horizontal plane that extends through the HUAV 101; the normal, as shown in FIG. 19A and FIG. 19B, is the line along which the HUAV 101 (in normal operation) would be expected to gain or lose altitude, and is the vertical axis depicted in FIG. 3B. The propeller is supported at the alpha angle (by the arm assembly 905) relative to the normal in such a way that the propeller generates (in use) a body torque sufficient to allow improved yaw torque control (yaw control) of the HUAV 101.

The instances of the arm assembly 905 with such angle-mounted propellers and motors are called controlled-torque instances of the arm assembly 905. The angled propellers generate a small amount of body torque, just enough to allow precise (improved) yaw torque control (yaw control) of the HUAV 101.

This (the alpha angle) causes a slight drop in efficiency, but allows the propeller technology to be made as low-drag as possible, without regard for yaw torque control within the propeller design itself, and effectively decoupling the drag characteristics of the propeller from the yaw torque generation (generation of yaw torque). Yaw torque generation is defined as the generation of torque in the yaw direction, around the centre of an operational instance of the HUAV 101, along the normal through the centre of the HUAV body 105, by the propellers, as a result of drag from propellers or from the angled mounting of the propellers, which angled mounting is angled relative to the normal. The net yaw torque generated by multiple propellers may be zero, with the individual yaw torques generated by each propeller summing to zero and cancelling, in which case there is no yaw movement in the HUAV 101. For the case where the rotation speeds of the propellers are set or varied appropriately, a non-zero sum of the yaw torques arises, which causes a non-zero yaw torque to be applied to the HUAV 101 overall, which may then cause the HUAV 101 to move or rotate along its yaw (normal) axis. Generally, the arm assembly 905 is configured to support the propeller in such a way that propeller drag of the propeller is decoupled from yaw torque requirements associated with HUAV 101. The alpha angle allows the propeller to be made as low-drag as possible without regard for yaw torque control within the propeller to decouple drag characteristics of the propeller from the generation of the yaw torque. As well, in accordance with an option, the arm assembly 905 may be field foldable and/or field removeable and/or field re-attachable.

Referring to FIGS. 18A, 18B and 18C, one embodiment of the arm assembly 905 provides a twist in an arm midsection 610 of the arm assembly 905. The twist formed in the arm midsection 610 causes the arm motor head 615 to be positioned at the alpha angle relative to the arm base 605 of the arm assembly 905. Generally, the arm assembly 905 may include a twisted propeller arm. It will be appreciated in accordance with another embodiment, the arm assembly 905 may be straight (not twisted), and the arm assembly 905 is twist mounted to the HUAV body 105 in such a way that the propeller then is aligned along the alpha angle relative to normal while the arm assembly 905 has no twist per se.

Another embodiment provides the arm motor head 615 mounted at the alpha angle relative to the arm midsection 610, and the arm midsection 610 is mounted straight on the arm base 605.

Another embodiment is provided in which the arm base 605, the arm midsection 610 and the arm motor head 615 are formed in one piece. In this manner, the arm motor head 615 is not a distinct element, but that the arm motor head 615 is positioned at an end of the arm assembly 905, and the arm motor head 615 is, nevertheless, at the alpha angle relative to the arm base 605 positioned at the other end of the arm assembly 905.

Another embodiment is provided in which the motor is not located (positioned) in the arm motor head 615, and the motor is located elsewhere in or on the HUAV 101; In this case the torque and rotational motion generated by the motor is conveyed to the propeller through a chain, a belt and/or a gearing mechanism. The propeller is mounted to the arm motor head 615. In this embodiment, the propeller shaft is supported by the arm motor head 615 of the arm assembly 905, and the propeller shaft extends to propeller. Any one of the propeller shaft and the arm assembly 905 (or a combination of both the propeller shaft and the arm assembly 905) is inclined at angle alpha about the arm axis. For this case it is not necessary to have the motor shaft inclined at angle alpha about the arm axis. The devices configured for the conveyance of torque and rotational motion from a motor to a shaft of a propeller by way of a chain, a belt and/or a gearing mechanism (etc.), in which propeller is not affixed directly onto the motor shaft, are known and therefore not discussed further here.

Though the references below describe a twist in the arm assembly 905, it will be appreciated that in general terms, an embodiment provides the arm assembly 905 configured to setup the alpha angle for the propeller to be non-zero relative to normal.

Aside from the twist in the arm assembly 905, the controlled-torque instance of the arm assembly 905 is substantially the same as the regular instance of the arm assembly 905 shown in FIGS. 1 to 8 and FIGS. 12A to 14.

In a multi-rotor implementation of the HUAV 101, when the HUAV 101 is hovering stably, the total yaw torque in one direction must cancel the total yaw torque in the opposite direction, or else the HUAV 101 may begin to rotate on its yaw axis.

Any set of torques which sums to a net zero yaw torque will accomplish this (e.g. one large torque in one direction and several smaller torques in the opposite direction will sum to net zero yaw torque), though it is customary to have half of the total number of propellers provide torque in one direction, and the remainder provide torque in the opposite direction.

The embodiment contemplated here uses this latter setup (though an alternative embodiment may use different numbers of torques in each direction).

Two instances of the controlled-torque instances of the arm assembly 905 each has propellers mounted at an angle (the alpha angle) in one direction (depicted in FIG. 18B), and two instances of the controlled-torque instances of the arm assembly 905 each has propellers mounted at an angle (the alpha angle) in the other direction (depicted in FIG. 18C). In addition, the instances of the arm assembly 905 may be keyed in such a way as to facilitate field-assembly of the HUAV 101 in such a way that the instances of the arm assembly 905 each support a respective instance of the propeller in predetermined positions that facilitate decoupling of the propeller drag of the instances of the propeller from the yaw torque requirements associated with HUAV 101.

In one embodiment, the ideal twist angle (alpha angle) of the arm assembly 905 is a function of the inertia of the HUAV 101 about the vertical axis, and a desired response time for the yaw torque control of the HUAV 101. A higher inertia of the HUAV 101 and a faster control response for the HUAV 101 may require a relatively higher value for the alpha angle.

The result of the twist angle of the arm assembly 905 is that the propeller thrust (T) is generated by the propellers. The alpha angle is of a magnitude that results in (causes) the propeller thrust (T) that has a first thrust component in the Z axis of the HUAV, and a second thrust component in the horizontal plane of the HUAV 101 (the plane to which the Z axis, the yaw axis and the normal axis are normal).

The first thrust component along the Z axis (the normal or the yaw axis) of the HUAV 101 is equal to:

$$[(T)*\cos(\text{alpha angle})]$$

It is understood that "cos" means "cosine". It is understood that "*" means multiplication.

The second thrust component along the horizontal axis of the HUAV 101 is equal to:

$$[(T)*\sin(\text{alpha angle})]$$

It is understood that "sin" means "sine".

The second thrust component in the horizontal axis results in a torque about the yaw axis that is equal to:

$$[(T)*\sin(\text{alpha angle})*(L)]$$

It is understood that (L) is the horizontal distance from the center of the HUAV 101 to the center of the propeller.

The design tradeoff is that the vertical thrust is reduced from (T) to (T)*cos(alpha angle), reducing hovering efficiency by a factor of cos(alpha angle).

In practice, in one embodiment, the alpha angle is about 3 degrees, which gives a yaw torque on the same order of magnitude as the aerodynamic drag of the propellers, effectively doubling the yaw torque control performance relative to un-twisted instance of the arm assembly 905, with a negligible vertical thrust efficiency loss of about 0.1%.

In another embodiment, the alpha angle is in a range from about 1 to about 10 degrees (an operational range from about one to about ten degrees): additional yaw torque control performance can be gained by increasing the alpha angle from about one to about ten degrees as may be used by a particular application.

With reference to FIG. 19A, there is depicted an example of the HUAV 101 with untwisted, non-controlled torque arms using high-efficiency propellers. The thrust (T) from each propeller is fully in the normal or the yaw-axis direction aligned along the force component (Tz) (with only a very insignificant thrust component, not shown, in the horizontal plane, which thrust is insignificant as a result of the very low drag from the high-efficiency propellers). Therefore, yaw motion cannot be easily generated by the propellers.

With reference to FIG. 19B, there is depicted an example of the HUAV 101 with controlled-torque arms using high-efficiency propellers. The thrust (T) from each propeller is now split between a force component (Tz) directed along the normal or yaw-axis, and a force component (TH) directed along the horizontal plane. For each arm, the force component (TH) is coplanar with the yaw axis (or normal) of the HUAV 101, and the normal to the plane of rotation of the propeller for that instance of the arm assembly 905; as the force component (TH) also lies in the horizontal plane, the line along the force component (TH) is defined by the intersection of these two planes. The direction of the force component (TH) for each instance of the arm assembly 905 is determined by the direction of rotation of the propeller for that instance of the arm assembly 905. As depicted in the embodiment shown in FIG. 19B, assuming the total thrust (T) achieved by each instance of the arm assembly 905 is the same, each force component (TH) is cancelled by the force component (TH) of another instance of the arm assembly 905, giving a net zero yaw torque to the HUAV 101. For the case where the thrust achieved by one or more instances of the propellers is increased or decreased so that the instances of the force component (TH) no longer cancel out, the net yaw torque on the HUAV 101 will no longer be zero, meaning that as a result of this torque, the HUAV 101 will tend to move or rotate along its yaw axis.

In another embodiment, the propellers may be angled towards or away from the HUAV body 105, within the plane formed by the arm axis and the yaw-axis normal. This angling, known as "roll/pitch angling," may be done to improve roll and pitch flight characteristics of the HUAV 101. The controlled-torque instances of the arm assembly 905 are configured to implement a rotation of the propellers along the arm axis, and the rotation being the alpha angle, regardless of and/or in addition to, any roll/pitch angling.

With Reference to FIG. 18B, FIG. 19A and, FIG. 19B, the following is an alternative description of the alpha angle 700: for each instance (i) of the socket body 115 (or of the arm assembly 905), where (i) may range from one to four instances for example, there is defined a coordinate frame having an axis [Xi] 710, an axis [Yi] 702, and an axis [Zi] 704. The coordinate frame is fixed relative to a body-coordinate frame associated with the HUAV body 105. The axis [Xi] 710 extends or is directed from the HUAV body 105 to a motor mounted on the arm assembly 905. The axis [Yi] 702 extends or is perpendicular to the axis [Xi] 710, and lies in the horizontal plane. The axis [Yi] 702 may be aligned co-linear with the axis of rotation for the case where the arm assembly 905 is foldable. The axis [Zi] 704 is orthogonal to the axis [Xi] 710 and the axis [Yi] 702. For the general case, the axis [Zi] 704 is not necessarily vertical (though the axis [Zi] 704 may be for a specific case) in the same sense as the normal 706. For the general case, the alpha angle 700 for an instance of the arm assembly 905 is a rotation about the axis [Xi] 710. This alternative description of the alpha angle 700 avoids reference to a common vertical axis (the normal 706); in this case, the motor shafts are angled in toward the HUAV body 105 (by relatively smaller angle that is a rotation about the axis [Yi] 702), as well as a yaw rotation about the axis [Xi] 710. Specifically, the arm assembly 905 is configured to support the propeller 708 at the alpha angle 700, and the alpha angle 700 is a rotation about an axis [Xi] 719 extending through the arm assembly 905 toward a motor coupled to the propeller 708. The axis [Yi] 702 and the axis [Zi] 704 of FIG. 19B are depicted in FIG. 18B and FIG. 18C.

In view of the description and the FIGS., in general terms, there is provided an apparatus including (and not limited to) a HUAV 101. The HUAV 101 includes (and is not limited to) an arm assembly 905 configured to support a propeller in such a way that propeller drag of the propeller is decoupled from yaw torque requirements associated with the HUAV 101. In accordance with an option, the arm assembly is field-foldable relative to the HUAV 101 between a flight-ready state and a folded state. In accordance with an option, the arm assembly 905 is also field-removable and is also field-re-attachable relative to the HUAV 101 between the folded state and the removed state. In accordance with an option, the apparatus may further include the HUAV body 105, and the arm assembly 905 is field-foldable relative to the HUAV body 105. In accordance with an option, the apparatus may further include a leg assembly 906 that is field-foldable relative to the HUAV 101 between the folded state and the removed state. In accordance with an option, the apparatus may further include the arm assembly 905 and the leg assembly 906 that are both simultaneously field-foldable relative to the HUAV 101 between the flight-ready state and the folded state. In accordance with an option, the leg assembly 906 is field-removable, field-re-attachable and field-foldable relative to the HUAV body 105 between the folded state and the removed state. In accordance with an option, the HUAV 101 may further include instances of the arm assembly 905 that are keyed to facilitate field-assembly of the HUAV 101 in such a way that the instances of the arm assembly 905 are configured to support a respective instance of a propeller at predetermined positions (on respective instances of the arm assembly 905) that facilitate decoupling of the propeller drag of the instances of the propeller from the yaw torque requirements associated with the HUAV 101. In accordance with an option, the arm assembly 905 is configured to support the propeller at an alpha angle relative to normal. In accordance with an option, instances of the arm assembly 905 have propellers mounted at the alpha angle oriented in a first direction, and instances of the arm assembly 905 have propellers mounted at the alpha angle oriented in a second direction. Other options for the apparatus as identified in this paragraph may include any combination and/or permutation of the technical features (assemblies, components, items, devices, etc.) as identified in the detailed description, as may be required and/or desired to suit a particular technical purpose and/or technical function. It will be appreciated that the arm assembly 905 may be provided and/or sold to the end user as a replacement part and/or with the HUAV body 105 (as may be required).

Keying of Components

Referring to FIG. 8 and FIG. 9, in one embodiment, for the case where the HUAV 101 is used with the controlled-torque instance of the arm assembly 905, it may be critical to ensure that the correct instance of the arm body 305 of the arm assembly 905 is installed in the correct instance of the socket body 115 (depicted in FIG. 9) of the socket assembly 915. In this embodiment, each socket assembly 915 has two instances of the socket keying screw boss 130 (depicted in FIG. 8 and FIG. 9): one on each side of the socket assembly 915. Each arm assembly 905 has two instances of the arm keying screw boss 336 (depicted in FIG. 8 and FIG. 12A): one instance on each side of the arm assembly 905. The arm keying screw boss 336 is designed and aligned such that the arm body 305 may normally be inserted into a socket aperture 120 (depicted in FIG. 9) without a problem. However, for the case where a keying screw 140 (depicted in FIG. 8) is inserted into both the arm keying screw boss 336 (depicted in FIG. 8 and FIG. 12A) and the socket keying screw boss 130 (depicted in FIG. 8 and FIG. 9) on the same side, then the keying screw 140 does not allow sufficient clearance for installation of the arm assembly 905. This may be an advantage for the case where the HUAV 101 is to be assembled and deployed as quickly as possible on the field (for mission-critical sorties or applications) without a possibility of assembly error.

During manufacturing and/or assembly of the HUAV 101, a screw is inserted into the left side of two instances of the socket keying screw boss 130 of the socket assembly 915, and the right side of the two other instances of the socket keying screw boss 130 of the socket assembly 915 (assuming four instances of the arm assembly 905 in total); this may be generalized to "n/2" instances of the socket assembly 915 with the right screws and "n/2" instances of the socket assembly 915 with the left screws, where "n" is the number of instances of the arm assembly 905 on the HUAV 101. Similarly, the appropriate (respective) instances of the arm assembly 905 have screws inserted into either their right or left instances of the arm keying screw boss 336 (depicted in FIG. 8 and FIG. 12A), depending on the orientations of the instances of the arm assembly 905. This arrangement then keys the instances of the arm assembly 905 and prevents the controlled-torque instance of the arm assembly 905 from being installed in an incorrect instance of the socket assembly 915 (as depicted in FIG. 9).

In view of the description and the FIGS., in general terms, there is provided an apparatus including (and not limited to) a HUAV 101. The HUAV 101 includes (and is not limited to) an arm assembly 905 and/or a leg assembly 906 that is keyed in such a way as to facilitate field-assembly relative to the HUAV 101. Other options for the apparatus as identified in this paragraph may include any combination and/or permutation of the technical features (assemblies, components, items, devices, etc.) as identified in the detailed description, as may be required and/or desired to suit a particular technical purpose and/or technical function. It will be appreciated that the arm assembly 905 and/or the leg assembly 906 may be provided and/or sold to the end user as a replacement part and/or with the HUAV body 105 (as may be required).

Parts and Components

Generally, disclosed are field-removable, field-re-attachable and field-foldable instances of the leg assembly 906 and the arm assembly 905 for the HUAV 101. The arm assembly 905 may be called a propeller arm. Also disclosed is a twisted propeller arm instance of the arm assembly 905 that is configured to decouple propeller drag from yaw torque requirements. Also disclosed is keying of components, such as the arm assembly 905, to make field assembly straight forward and less error prone.

In various embodiments, the socket assembly 915 may include some or all of the following components.

Referring to FIG. 5, a HUAV body 105 is provided. A socket cavity 110 is formed on the first side of the HUAV body 105. A socket body 115 is affixed into the socket cavity 110. A socket aperture 120 is formed on the first side of the socket body 115.

Referring to FIG. 8, a large-area arm stop 125 is formed around the edge of the socket aperture 120. One or more instances of the socket keying screw boss 130 are formed inside the socket body 115. A keying screw boss screw aperture 135 (depicted in FIG. 5) is formed inside each instance of the socket keying screw boss 130. A keying screw 140 (depicted in FIG. 8) is mounted inside one instance of the keying screw boss screw aperture 135 (depicted in FIG. 5). A shallow-angle latching face 145 is formed inside the top of the socket body 115.

Referring to FIG. 4, a connector aperture 150 is formed on the second side of the socket body 115. A connector backing bracket 155 is affixed to the outside of the socket body 115 covering the connector aperture 150. A connector 156 is affixed to the connector backing bracket 155 within the connector aperture 150.

Referring to FIG. 5, a socket side wall rib 160 is formed inside the socket body 115. One or more instances of the socket rotation stops 165 are formed on the interior of the socket body 115. An arm mounting shaft 170 is mounted or molded immovably across the interior of the socket body 115. A leg-mount assembly 909 is mounted rotatably onto the arm mounting shaft 170.

Figure 11:
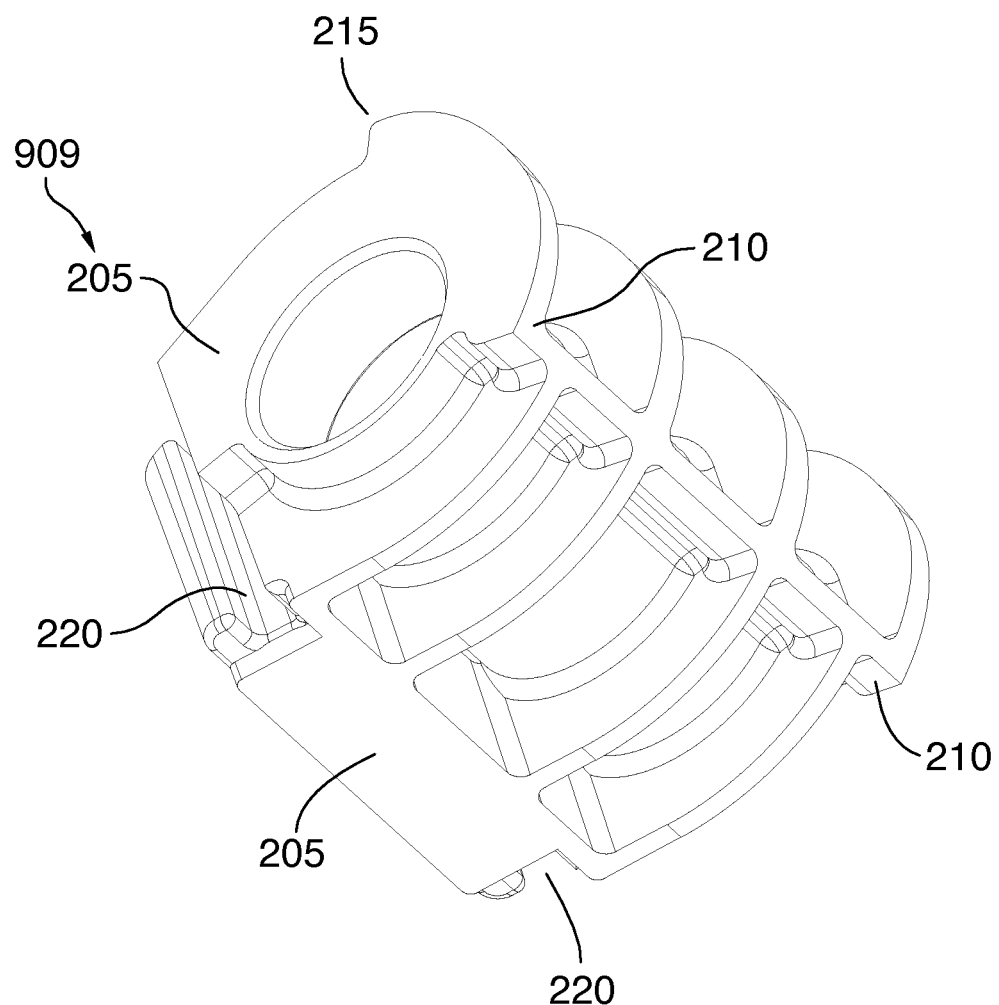
FIG. 11 (Sheet 11/19) is an isometric view of an embodiment of the leg-mount assembly of FIG. 10 from a second side, and the leg-mount assembly is used with the HUAV of FIG. 1.

Referring to FIG. 10 and FIG. 11, the leg-mount assembly 909 includes the following items. A leg-mount body 205 is provided. A leg mount rotation stop rib 210 is formed on the exterior of the leg-mount body 205. One or more arm engagement teeth 215 are formed on the exterior of the leg-mount body 205. One or more leg mounting channels 220 are formed on the exterior of the leg-mount body 205. A leg locking lip 225 is affixed immovably to the exterior of the leg-mount body 205. A leg locking depression 230 is formed on the exterior of the leg-mount body 205.

Referring to FIG. 12A, FIG. 12B, FIG. 12C, FIG. 13 and FIG. 14, in various embodiments, the arm assembly 905 may include some or all of the following items. An arm body 305 is provided. A snap extension 310 is formed perpendicularly near the first end of the arm body 305. A pivot extension 315 is formed perpendicularly at the first end of the arm body 305. A hinge aperture 320 is formed on the arm body 305 between the snap extension 310 and the pivot extension 315. Snap extension grooves 325 are formed across the outside of the snap extension 310. A circuit board mounting face 330 is formed on the underside of the first end of the arm body 305. A circuit board 335 is affixed to the outside of the circuit board mounting face 330. An arm keying screw boss 336 is formed on the outside of the arm body 305. A socket engagement lip 337 is formed around the edge of the first end of the arm body 305. A mount engagement lip 338 is formed on the underside at the first end of the arm body 305. A drainage hole 340 is formed on the underside of the arm body 305. A latch button aperture 345 is formed on the top side of the arm body 305. A latching face aperture 350 is formed at the first end of the arm body 305. A latch pivot boss 355 is formed partially spanning the inside of the arm body 305. A latch pivot boss support rib 360 is formed between the latch pivot boss 355 and the first end of the arm body 305. A wire guide rib 365 is formed spanning the inside of the arm body 305. Spring centering ribs 370 are formed on the top side of the wire guide rib 365. A spring pocket 375 is formed on the top side of the wire guide rib 365. A spring 380 is mounted at the first end on the spring-mounting post 425 of the latch body 405 (latch assembly 908), and at the second end within the spring pocket 375 between the spring centering ribs 370. A wire-guide channel 385 is formed between the bottom side of the wire guide rib 365 and the arm body 305. A latch assembly 908 is mounted moveably within the arm body 305.

Figure 15:
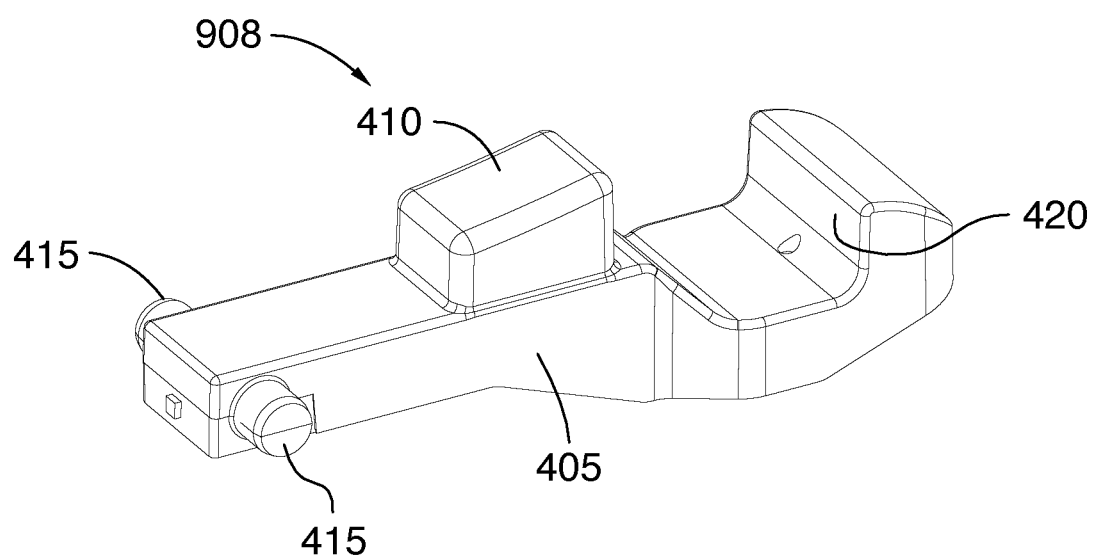
FIG. 15 (Sheet 15/19) is an isometric view of a top side of an embodiment of the latch assembly of FIG. 12C.
Figure 16:
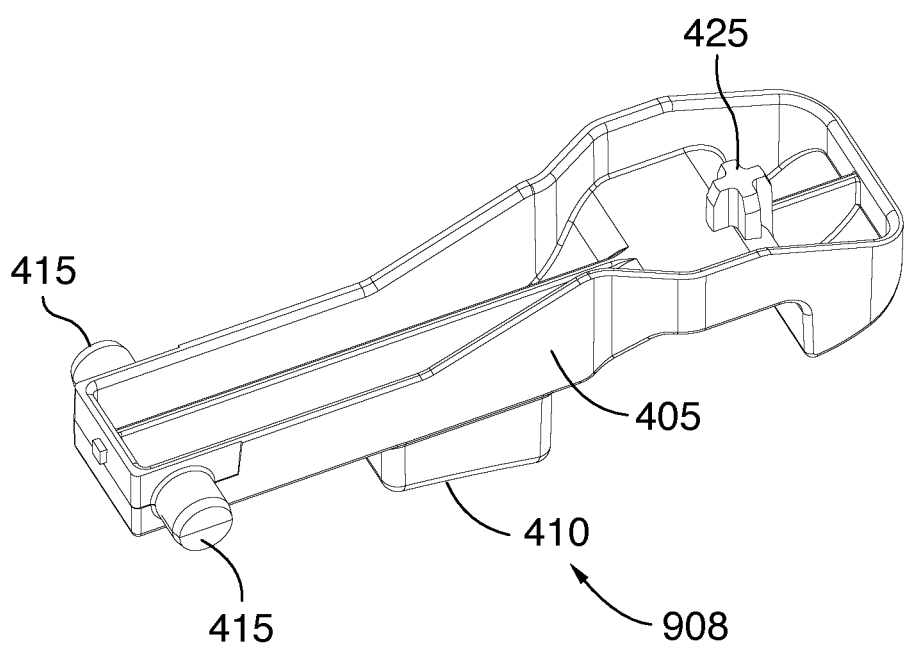
FIG. 16 (Sheet 16/19) is an isometric view of a bottom side of an embodiment of the latch assembly of FIG. 15.

Referring to FIG. 15 and FIG. 16, the latch assembly 908 may include the following components: a latch body 405 is provided. A latch button 410 is formed on the top side of the latch body 405. A shallow-angle latching face 420 is formed at the first end of the latch body 405. One or more instance of a pivot pin 415 is formed on the sides of the latch body 405.

Referring to FIG. 12C, the latch assembly 908 optionally may include the following components. A spring-mounting post 425 is formed on the bottom of the latch body 405.

Referring to FIG. 17, in various embodiments, the leg assembly 906 may include some or all of the following components. A leg body 505 is provided. A leg extension 510 is formed at the first end of the leg body 505. The leg-mounting ribs 515 are formed at the first end of the leg body 505. A leg snap 520 is formed at the first end of the leg body 505.

Referring to FIG. 18A, FIG. 18B and FIG. 18C, in various embodiments, a controlled-torque instance of the arm assembly 905 may include some or all of the various components of a regular instance of the arm assembly 905, such as: an arm base 605 that is formed on or coupled to the arm body 305. An arm midsection 610 is formed on or coupled to the arm body 305. An arm motor head 615 is formed on or coupled to the arm body 305.

The various aspects (embodiments) may have a number of advantages such as: (A) it is an advantage for the HUAV 101 to be foldable; (B) it is an advantage for the arm assembly 905 to be both foldable and removable; (C) it is an advantage for the leg assembly 906 to be both foldable and removable; (D) it is an advantage for the folding of the arm assembly 905 and/or the leg assembly 906 not to conflict with or inhibit one another; (E) it is an advantage for the arm assembly 905 and/or the leg assembly 906 to be easily re-inserted, in the correct orientation and in the correct position; (F) it is an advantage for the arm assembly 905 and/or the leg assembly 906 not to be easily re-inserted into the wrong instance of the socket assembly 915, while at the same time not causing damage to the arm assembly 905 and/or the leg assembly 906 if insertion into the wrong instance of the socket assembly 915 is attempted; (G) it is an advantage for the arm assembly 905 and/or the leg assembly 906 to be strongly held in the normal operating position; (H) it is an advantage for the arm assembly 905 and/or the leg assembly 906 to be weakly held in the folded state (folded position); and/or (I) it is an advantage for the drag characteristics associated with the instances of the propeller of the HUAV 101 to be decoupled from the yaw torque control requirements of the HUAV 101.

Additional Description

The following clauses are offered as further description of the examples of the apparatus. Any one or more of the following clauses may be combinable with any another one or more of the following clauses. Any one of the following clauses may stand on its own merit without having to be combined with another other of the above-identified clauses. Clause (1): an apparatus, comprising: a hovering unmanned aerial vehicle, including: an arm assembly being configured to support a propeller in such a way that propeller drag of the propeller is decoupled from yaw torque requirements associated with the hovering unmanned aerial vehicle. Clause (2): the apparatus of any clause mentioned in this paragraph, wherein: the arm assembly is field-foldable relative to the hovering unmanned aerial vehicle between a flight-ready state and a folded state. Clause (3): the apparatus of any clause mentioned in this paragraph, wherein: the hovering unmanned aerial vehicle further includes: instances of the arm assembly being keyed to facilitate field-assembly of the hovering unmanned aerial vehicle in such a way that the instances of the arm assembly are configured to support a respective instance of the propeller at predetermined positions that facilitate decoupling of the propeller drag of the instances of the propeller from the yaw torque requirements associated with the hovering unmanned aerial vehicle. Clause (4): the apparatus of any clause mentioned in this paragraph, wherein: the arm assembly includes: a twisted propeller arm. Clause (5): the apparatus of any clause mentioned in this paragraph, wherein: the arm assembly is configured to support the propeller at an alpha angle relative to normal. Clause (6): the apparatus of any clause mentioned in this paragraph, wherein: the arm assembly is configured to support the propeller at an alpha angle, and the alpha angle is a rotation about an axis extending through the arm assembly toward a propeller shaft, the propeller shaft is supported by the arm assembly, and the propeller shaft is coupled to the propeller. Clause (7): the apparatus of any clause mentioned in this paragraph, wherein: the propeller is supported at the alpha angle relative to normal in such a way that the propeller generates a body torque sufficient to allow improved yaw control of the hovering unmanned aerial vehicle. Clause (8): the apparatus of any clause mentioned in this paragraph, wherein: the alpha angle allows the propeller to be made as low-drag as possible without regard for yaw control within the propeller to decouple drag characteristics of the propeller from generation of yaw torque. Clause (9): the apparatus of any clause mentioned in this paragraph, wherein: the arm assembly includes: an arm base coupled to the arm assembly; an arm midsection coupled to the arm assembly; and an arm motor head coupled to the arm assembly, and a twist is formed in the arm midsection of the arm assembly, and the twist formed in the arm midsection causes the arm motor head to be at the alpha angle relative to the arm base of the arm assembly. Clause (10): the apparatus of any clause mentioned in this paragraph, wherein: the arm assembly includes: an arm base coupled to the arm assembly; an arm midsection coupled to the arm assembly; and an arm motor head coupled to the arm assembly, and the arm motor head is mounted at the alpha angle relative to the arm midsection, and the arm midsection is mounted straight on the arm base. Clause (11): the apparatus of any clause mentioned in this paragraph, wherein: the arm assembly includes: an arm base coupled to the arm assembly; an arm midsection coupled to the arm assembly; and an arm motor head coupled to the arm assembly, and the arm base, the arm midsection and the arm motor head are formed in one piece, and the arm motor head is positioned at an end of the arm assembly, and the arm motor head is at the alpha angle relative to the arm base of the arm assembly. Clause (12): the apparatus of any clause mentioned in this paragraph, wherein: instances of the arm assembly have propellers mounted at the alpha angle oriented in a first direction; and instances of the arm assembly have propellers mounted at the alpha angle oriented in a second direction. Clause (13): the apparatus of any clause mentioned in this paragraph, wherein: the alpha angle is a function of: the inertia of the hovering unmanned aerial vehicle about a vertical axis, and a desired response time in a yaw control of the hovering unmanned aerial vehicle. Clause (14): the apparatus of any clause mentioned in this paragraph, wherein: the alpha angle is of a magnitude that results in a propeller thrust (T) generated by the propeller that has: a first thrust component along a Z axis of the hovering unmanned aerial vehicle being [(T)*cos(the alpha angle)]; and a second thrust component along a horizontal axis of the hovering unmanned aerial vehicle being [(T)*sin (the alpha angle)], and where the second thrust component along the horizontal axis causes a torque about a yaw axis being [(T)*sine of the alpha angle*(L)], and where (L) is a horizontal distance from a center of the hovering unmanned aerial vehicle to a center of the propeller. Clause (15): the apparatus of any clause mentioned in this paragraph, wherein: the alpha angle is in a range from about one to about ten degrees. Clause (16): an apparatus, comprising: a hovering unmanned aerial vehicle, including: an arm assembly being field-foldable relative to the hovering unmanned aerial vehicle between a flight-ready state and a folded state. Clause (17): the apparatus of any clause mentioned in this paragraph, wherein: the arm assembly is also field-removable and is also field-re-attachable relative to the hovering unmanned aerial vehicle between the folded state and a removed state. Clause (18): the apparatus of any clause mentioned in this paragraph, further comprising: a hovering unmanned aerial vehicle body, and the arm assembly is field-foldable relative to the hovering unmanned aerial vehicle body. Clause (19): the apparatus of any clause mentioned in this paragraph, further comprising: a leg assembly being field-foldable relative to the hovering unmanned aerial vehicle between the folded state and a removed state. Clause (20): the apparatus of any clause mentioned in this paragraph, further comprising: the arm assembly and the leg assembly are simultaneously field-foldable relative to the hovering unmanned aerial vehicle between the flight-ready state and the folded state. Clause (21): the apparatus of any clause mentioned in this paragraph, wherein: the leg assembly is field-removable, field-re-attachable and field-foldable relative to a hovering unmanned aerial vehicle body between the folded state and the removed state. Clause (22): the apparatus of any clause mentioned in this paragraph, further comprising: a socket assembly, including: a socket body being configured to affix into a socket cavity formed on a first side of a hovering unmanned aerial vehicle body. Clause (23): the apparatus of any clause mentioned in this paragraph, wherein: the socket assembly further includes: an arm mounting shaft spanning across the socket body, and the arm mounting shaft is configured to interface with the arm assembly; and a leg-mount assembly mounted rotatably onto the arm mounting shaft, and the leg-mount assembly is configured to interface with a leg assembly. Clause (24): the apparatus of any clause mentioned in this paragraph, further comprising: a latch assembly configured to latchably connect and latchably disconnect the arm mounting shaft with the arm assembly. Clause (1): the apparatus of any clause mentioned in this paragraph, wherein: the arm assembly is keyed in such a way as to facilitate field-assembly relative to the hovering unmanned aerial vehicle. Clause (26): an apparatus, comprising: a hovering unmanned aerial vehicle, including: an arm assembly being keyed in such a way as to facilitate field-assembly relative to the hovering unmanned aerial vehicle. Clause (27): the apparatus of any clause mentioned in this paragraph, wherein the hovering unmanned aerial vehicle further includes: a socket assembly, including: a socket body being configured to affix into a socket cavity formed on a hovering unmanned aerial vehicle body. Clause (28): the apparatus of any clause mentioned in this paragraph, wherein the hovering unmanned aerial vehicle further includes: a hovering unmanned aerial vehicle body; and a socket assembly, the hovering unmanned aerial vehicle body and the socket assembly forming a unitary unit formed from a piece of material. Clause (29): the apparatus of any one of any clause mentioned in this paragraph, wherein: the socket assembly further includes: an arm mounting shaft spanning across the socket body, and the arm mounting shaft is configured to interface with the arm assembly; and a leg-mount assembly mounted rotatably onto the arm mounting shaft, and the leg-mount assembly is configured to interface with a leg assembly. Clause (30): the apparatus of any clause mentioned in this paragraph, wherein: the arm assembly is keyed and prevents the arm assembly from being installed in an incorrect instance of the socket assembly. Clause (31): the apparatus of any clause mentioned in this paragraph, wherein: the arm assembly has an arm keying screw boss; and the socket assembly includes a socket keying screw boss; the arm keying screw boss is designed and aligned such that the arm assembly may normally be inserted into the socket assembly, and for a case where a keying screw is inserted into both the arm keying screw boss and the socket keying screw boss on the same side, the keying screw does not allow sufficient clearance for the arm assembly to be installed.

It may be appreciated that the assemblies and modules described above may be connected with each other as may be used to perform desired functions and tasks that are within the scope of persons of skill in the art to make such combinations and permutations without having to describe each and every one of them in explicit terms. There is no particular assembly, or components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:
1. An apparatus, comprising:
   a hovering unmanned aerial vehicle, including:
      an arm assembly being configured to support a propeller in such a way that propeller drag of the propeller is decoupled from yaw torque generation requirements associated with the hovering unmanned aerial vehicle; and
      a socket assembly including:
         a socket body being configured to affix into a socket cavity formed on a first side of a hovering unmanned aerial vehicle body;

an arm mounting shaft spanning across the socket body, the arm mounting shaft being configured to interface with the arm assembly; and
a leg-mount assembly mounted rotatably onto the arm mounting shaft, the leg-mount assembly being configured to interface with a lea assembly.

2. The apparatus of claim 1, wherein:
the arm assembly is field-foldable relative to the hovering unmanned aerial vehicle between a flight-ready state and a folded state.

3. The apparatus of claim 1, wherein:
the hovering unmanned aerial vehicle further includes:
instances of the arm assembly including a protruding member operable to prevent the arm assembly from being installed in an incorrect instance of the socket assembly to facilitate field-assembly of the hovering unmanned aerial vehicle in such a way that the instances of the arm assembly are configured to support a respective instance of the propeller at predetermined positions that facilitate decoupling of the propeller drag of the instances of the propeller from the yaw torque generation requirements of the hovering unmanned aerial vehicle.

4. The apparatus of claim 1, wherein:
the arm assembly includes:
a twisted propeller arm.

5. The apparatus of claim 1, wherein:
the arm assembly is configured to support the propeller at an alpha angle relative to normal.

6. The apparatus of claim 1, wherein:
the arm assembly is configured to support the propeller at an alpha angle, and the alpha angle is a rotation about an axis extending through the arm assembly toward a propeller shaft, the propeller shaft is supported by the arm assembly, and the propeller shaft is coupled to the propeller.

7. The apparatus of claim 5, wherein:
the propeller is supported at the alpha angle relative to normal in such a way that the propeller generates a body torque sufficient to allow improved yaw control of the hovering unmanned aerial vehicle.

8. The apparatus of claim 5, wherein:
the alpha angle allows the propeller to be made as low-drag as possible without regard for yaw control within the propeller to decouple drag characteristics of the propeller from generation of yaw torque.

9. The apparatus of claim 5, wherein:
the arm assembly includes:
an arm base coupled to the arm assembly;
an arm midsection coupled to the arm assembly; and
an arm motor head coupled to the arm assembly, and
a twist is formed in the arm midsection of the arm assembly, and the twist formed in the arm midsection causes the arm motor head to be at the alpha angle relative to the arm base of the arm assembly.

10. The apparatus of claim 5, wherein:
the arm assembly includes:
an arm base coupled to the arm assembly;
an arm midsection coupled to the arm assembly; and
an arm motor head coupled to the arm assembly, and
the arm motor head is mounted at the alpha angle relative to the arm midsection, and
the arm midsection is mounted straight on the arm base.

11. The apparatus of claim 5, wherein:
the arm assembly includes:
an arm base coupled to the arm assembly;
an arm midsection coupled to the arm assembly; and
an arm motor head coupled to the arm assembly, and
the arm base, the arm midsection and the arm motor head are formed in one piece, and
the arm motor head is positioned at an end of the arm assembly, and
the arm motor head is at the alpha angle relative to the arm base of the arm assembly.

12. The apparatus of claim 5, wherein:
instances of the arm assembly have propellers mounted at the alpha angle oriented in a first direction; and
instances of the arm assembly have propellers mounted at the alpha angle oriented in a second direction.

13. The apparatus of claim 5, wherein:
the alpha angle is a function of:
the inertia of the hovering unmanned aerial vehicle about a vertical axis, and
a desired response time in a yaw control of the hovering unmanned aerial vehicle.

14. The apparatus of claim 5, wherein:
the alpha angle is of a magnitude that results in a propeller thrust (T) generated by the propeller that has:
a first thrust component along a Z axis of the hovering unmanned aerial vehicle being [(T)*cos(the alpha angle)]; and
a second thrust component along a horizontal axis of the hovering unmanned aerial vehicle being [(T)*sin(the alpha angle)], and
where the second thrust component along the horizontal axis causes a torque about a yaw axis being [(T)*sine of the alpha angle*(L)], and
where (L) is a horizontal distance from a center of the hovering unmanned aerial vehicle to a center of the propeller.

15. The apparatus of claim 5, wherein:
the alpha angle is in a range from about one to about ten degrees.

16. An apparatus, comprising:
a hovering unmanned aerial vehicle, including:
an arm assembly being field-foldable relative to the hovering unmanned aerial vehicle between a flight-ready state and a folded state;
a socket assembly, including:
a socket body being configured to affix into a socket cavity formed on a first side of a hovering unmanned aerial vehicle body;
an arm mounting shaft spanning across the socket body, the arm mounting shaft being configured to interface with the arm assembly; and
a leg-mount assembly mounted rotatably onto the arm mounting shaft, the leg-mount assembly being configured to interface with a leg assembly.

17. The apparatus of claim 16, wherein:
the arm assembly is also field-removable and is also field-re-attachable relative to the hovering unmanned aerial vehicle between the folded state and a removed state.

18. The apparatus of claim 16, further comprising:
a hovering unmanned aerial vehicle body, and
the arm assembly is field-foldable relative to the hovering unmanned aerial vehicle body.

19. The apparatus of claim 16, further comprising:
a leg assembly being field-foldable relative to the hovering unmanned aerial vehicle between the folded state and a removed state.

20. The apparatus of claim 19, further comprising:
the arm assembly and the leg assembly are simultaneously field-foldable relative to the hovering unmanned aerial vehicle between the flight-ready state and the folded state.

21. The apparatus of claim 19, wherein:
the leg assembly is field-removable, field-re-attachable and field-foldable relative to a hovering unmanned aerial vehicle body between the folded state and the removed state.

22. The apparatus of claim 16, further comprising:
a latch assembly configured to latchably connect and latchably disconnect the arm mounting shaft with the arm assembly.

23. The apparatus of claim 16, wherein:
the arm assembly includes a protruding member operable to prevent the arm assembly from being installed in an incorrect instance of the socket assembly to facilitate field-assembly relative to the hovering unmanned aerial vehicle.

24. An apparatus, comprising:
a hovering unmanned aerial vehicle, including:
an arm assembly; and
a socket assembly, including:
a socket body being configured to affix into a socket cavity formed on a hovering unmanned aerial vehicle body;
an arm mounting shaft spanning across the socket body, the arm mounting shaft being configured to interface with the arm assembly; and
a leg-mount assembly mounted rotatably onto the arm mounting shaft, the leg-mount assembly being configured to interface with a leg assembly,
wherein the arm assembly includes a protruding member operable to prevent the arm assembly from being installed in an incorrect instance of the socket assembly to facilitate field-assembly relative to the hovering unmanned aerial vehicle.

25. The apparatus of claim 24, wherein
the hovering unmanned aerial vehicle further includes:
a hovering unmanned aerial vehicle body; and
a socket assembly, the hovering unmanned aerial vehicle body and the socket assembly forming a unitary unit formed from a piece of material.

26. The apparatus of claim 24, wherein:
the arm assembly is keyed and prevents the arm assembly from being installed in an incorrect instance of the socket assembly.

27. The apparatus of claim 26, wherein:
the arm assembly has an arm keying screw boss; and
the socket assembly includes a socket keying screw boss;
the arm keying screw boss is designed and aligned such that the arm assembly may normally be inserted into the socket assembly, and for a case where a keying screw is inserted into both the arm keying screw boss and the socket keying screw boss on the same side, the keying screw does not allow sufficient clearance for the arm assembly to be installed.

* * * * *